(12) United States Patent
Wagner et al.

(10) Patent No.: US 11,472,633 B2
(45) Date of Patent: Oct. 18, 2022

(54) SYSTEMS AND METHODS FOR PROCESSING OBJECTS INCLUDING SEMI-AUTONOMOUS STATIONS AND AUTOMATED OUTPUT PROCESSING

(71) Applicant: Berkshire Grey Operating Company, Inc., Bedford, MA (US)

(72) Inventors: Thomas Wagner, Concord, MA (US); Thomas Allen, Reading, MA (US); William Hartman Fort, Stratham, NH (US); Kyle Maroney, North Attleboro, MA (US); Samuel Naseef, Medford, MA (US); Andrew Gauthier, Somerville, MA (US); Kevin Ahearn, Nebo, NC (US); John Richard Amend, Jr., Belmont, MA (US); Benjamin Cohen, Somerville, MA (US); Michael Dawson-Haggerty, Pittsburgh, PA (US); Christopher Geyer, Arlington, MA (US); Jennifer Eileen King, Oakmont, PA (US); Thomas Koletschka, Cambridge, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 333 days.

(21) Appl. No.: 16/668,880

(22) Filed: Oct. 30, 2019

(65) Prior Publication Data
US 2020/0130951 A1 Apr. 30, 2020

Related U.S. Application Data

(60) Provisional application No. 62/752,607, filed on Oct. 30, 2018.

(51) Int. Cl.
*B65G 43/10* (2006.01)

(52) U.S. Cl.
CPC .................................. *B65G 43/10* (2013.01)

(58) Field of Classification Search
CPC ....................................................... B65G 43/10
(Continued)

(56) References Cited

U.S. PATENT DOCUMENTS

| 4,722,653 A | 2/1988 | Williams et al. |
| 4,759,439 A | 7/1988 | Hartlepp |

(Continued)

FOREIGN PATENT DOCUMENTS

| DE | 102005032533 A1 | 1/2007 |
| DE | 102014111396 A1 | 2/2016 |

(Continued)

OTHER PUBLICATIONS

International Search Report and Written Opinion issued by the International Searching Authority dated Feb. 13, 2020 in related International Application No. PCT/US2019/058845, 15 pages.

(Continued)

*Primary Examiner* — Kyle O Logan
(74) *Attorney, Agent, or Firm* — Gesmer Updegrove LLP

(57) ABSTRACT

A semi-autonomous processing system for processing objects is disclosed. The semi-autonomous processing system includes an input conveyance system for moving objects (Continued)

to a presentation area, a perception system including perception units that are directed toward a detection area for providing perception data regarding an object in the presentation area, at least two transport systems, each of which is adapted to receive the object and move the object in either of reciprocal directions, and a manual workstation area between the perception area the at least two transport systems.

39 Claims, 27 Drawing Sheets

(58) Field of Classification Search
USPC .......................................................... 700/230
See application file for complete search history.

(56) References Cited

U.S. PATENT DOCUMENTS

| | | | |
|---|---|---|---|
| 4,846,335 A | 7/1989 | Hartlepp | |
| 4,895,242 A | 1/1990 | Michel | |
| 4,963,251 A * | 10/1990 | Bohm | B07C 1/04 198/370.03 |
| 5,190,162 A | 3/1993 | Hartlepp | |
| 5,352,081 A | 10/1994 | Tanaka | |
| 5,419,457 A | 5/1995 | Ross et al. | |
| 5,595,263 A | 1/1997 | Pignataro | |
| 5,685,687 A | 11/1997 | Frye | |
| 5,794,788 A | 8/1998 | Massen | |
| 5,794,789 A | 8/1998 | Payson et al. | |
| 5,839,566 A | 11/1998 | Bonnet | |
| 5,860,900 A | 1/1999 | Dunning et al. | |
| 5,979,633 A * | 11/1999 | Bonnet | B65G 19/02 198/370.09 |
| 6,079,570 A | 6/2000 | Oppliger et al. | |
| 6,189,702 B1 * | 2/2001 | Bonnet | B65G 47/82 198/370.02 |
| 6,208,908 B1 | 3/2001 | Boyd et al. | |
| 6,323,452 B1 | 11/2001 | Bonnet | |
| 6,499,604 B1 * | 12/2002 | Kitson | B07C 3/08 198/371.2 |
| 7,887,130 B1 * | 2/2011 | Zvolena | A47C 15/004 297/260.2 |
| 9,102,336 B2 | 8/2015 | Rosenwinkel | |
| 10,438,034 B2 | 10/2019 | Wagner et al. | |
| 10,494,192 B2 | 12/2019 | DeWitt et al. | |
| 10,576,621 B2 | 3/2020 | Wagner et al. | |
| 10,583,553 B2 | 3/2020 | Wagner et al. | |
| 10,596,696 B2 | 3/2020 | Wagner et al. | |
| 10,639,678 B2 | 5/2020 | Cherry et al. | |
| 10,646,991 B2 | 5/2020 | Wagner et al. | |
| 10,730,078 B2 | 8/2020 | Wagner et al. | |
| 10,843,333 B2 | 11/2020 | Wagner et al. | |
| 10,875,057 B2 | 12/2020 | Wagner et al. | |
| 10,913,614 B2 | 2/2021 | Wagner et al. | |
| 11,055,504 B2 | 7/2021 | Wagner et al. | |
| 11,080,496 B2 | 8/2021 | Wagner et al. | |
| 11,200,390 B2 | 12/2021 | Wagner et al. | |
| 11,219,311 B1 * | 1/2022 | Kondziela | A47B 21/04 |
| 2002/0092801 A1 | 7/2002 | Dominguez | |
| 2002/0113365 A1 * | 8/2002 | Britton | B07C 3/08 271/303 |
| 2002/0170850 A1 | 11/2002 | Bonham et al. | |
| 2002/0179502 A1 | 12/2002 | Cerulti et al. | |
| 2004/0195320 A1 * | 10/2004 | Ramsager | B07C 3/20 235/385 |
| 2006/0182543 A1 | 8/2006 | Schaefer | |
| 2011/0094854 A1 * | 4/2011 | Hayduchok | B65G 1/04 198/370.1 |
| 2012/0128454 A1 | 5/2012 | Hayduchok et al. | |
| 2014/0244026 A1 | 8/2014 | Neiser | |
| 2015/0081090 A1 * | 3/2015 | Dong | B07C 5/00 700/230 |
| 2015/0104286 A1 | 4/2015 | Hansl et al. | |
| 2015/0114799 A1 | 4/2015 | Hansl et al. | |
| 2016/0167227 A1 | 6/2016 | Wellman et al. | |
| 2016/0274586 A1 | 9/2016 | Stubbs et al. | |
| 2017/0021499 A1 | 1/2017 | Wellman et al. | |
| 2017/0057756 A1 | 3/2017 | Dugat et al. | |
| 2017/0066594 A1 | 3/2017 | Milo et al. | |
| 2017/0066597 A1 | 3/2017 | Hiroi | |
| 2017/0106532 A1 | 4/2017 | Wellman et al. | |
| 2017/0121113 A1 | 5/2017 | Wagner et al. | |
| 2017/0136632 A1 | 5/2017 | Wagner et al. | |
| 2017/0157649 A1 * | 6/2017 | Wagner | B07C 5/3412 |
| 2017/0225330 A1 | 8/2017 | Wagner et al. | |
| 2017/0349385 A1 | 12/2017 | Moroni et al. | |
| 2018/0057264 A1 | 3/2018 | Wicks et al. | |
| 2018/0085788 A1 | 3/2018 | Engel et al. | |
| 2018/0127219 A1 * | 5/2018 | Wagner | B65G 47/82 |
| 2018/0148272 A1 | 5/2018 | Wagner et al. | |
| 2018/0186572 A1 | 7/2018 | Issing | |
| 2018/0244473 A1 | 8/2018 | Mathi et al. | |
| 2018/0273298 A1 | 9/2018 | Wagner et al. | |
| 2018/0327198 A1 * | 11/2018 | Wagner | B65G 67/02 |
| 2018/0330134 A1 | 11/2018 | Wagner et al. | |
| 2018/0333749 A1 | 11/2018 | Wagner et al. | |
| 2019/0127147 A1 | 5/2019 | Wagner et al. | |
| 2019/0337723 A1 | 11/2019 | Wagner et al. | |
| 2020/0016746 A1 | 1/2020 | Yap et al. | |
| 2020/0017314 A1 | 1/2020 | Rose et al. | |
| 2020/0130951 A1 * | 4/2020 | Wagner | B65G 47/962 |
| 2020/0143127 A1 | 5/2020 | Wagner et al. | |
| 2020/0151407 A1 | 5/2020 | Wagner et al. | |
| 2021/0039140 A1 * | 2/2021 | Geyer | B07C 3/008 |

FOREIGN PATENT DOCUMENTS

| | | |
|---|---|---|
| JP | H0619602 U | 3/1994 |
| KR | 20160148397 A | 12/2016 |
| WO | 2008089150 A2 | 7/2008 |
| WO | 2008091733 A2 | 7/2008 |
| WO | 2010099873 A1 | 9/2010 |
| WO | 2015035300 A1 | 3/2015 |
| WO | 2016100235 A1 | 6/2016 |
| WO | 2018175466 A1 | 9/2018 |

OTHER PUBLICATIONS

Notification Concerning Transmittal of International Preliminary Report on Patentability (Chapter I of the Patent Cooperation Treaty) and the International Preliminary Report on Patentability issued by the International Bureau of WIPO in related International Application No. PCT/US2019/058845 dated May 14, 2021, 9 pages.

Communication pursuant to Rules 161(1) and 162 EPC issued by the European Patent Office in related European Application No. 19809224.9 dated Jun. 9, 2021, 3 pages.

Notice on the First Office Action, and it's English translation, issued by the China National Intellectual Property Administration in related Chinese Patent Application No. 201980072702.1 dated Mar. 23, 2022, 27 pages.

* cited by examiner

SYSTEMS AND METHODS FOR PROCESSING OBJECTS INCLUDING SEMI-AUTONOMOUS STATIONS AND AUTOMATED OUTPUT PROCESSING

PRIORITY

The present application claims priority to U.S. Provisional Patent Application Ser. No. 62/752,607 filed Oct. 30, 2018, the disclosure of which is hereby incorporated by reference in its entirety.

BACKGROUND

The invention generally relates to automated, robotic and other processing systems, and relates in particular to automated and robotic systems intended for use in environments requiring, for example, that a variety of objects (e.g., articles, parcels or packages) be processed, e.g., sorted and/or otherwise distributed to several output destinations.

Many object distribution systems receive objects in an organized or disorganized stream that may be provided as individual objects or objects aggregated in groups such as in bags, arriving on any of several different conveyances, commonly a conveyor, a truck, a pallet, a Gaylord, or a bin. Each object must then be distributed to the correct destination container, as determined by identification information associated with the object, which is commonly determined by a label printed on the object. The destination container may take many forms, such as a bag or a bin.

The processing of such objects has traditionally been done by human workers that scan the objects, e.g., with a handheld barcode scanner, and then place the objects at assigned locations. For example, many order fulfillment operations achieve high efficiency by employing a process called wave picking. In wave picking, orders are picked from warehouse shelves and placed at locations (e.g., into bins) containing multiple orders that are sorted downstream. At the processing stage individual objects are identified, and multi-object orders are consolidated, for example into a single bin or shelf location, so that they may be packed and then shipped to customers. The processing (e.g., sorting) of these objects has traditionally been done by hand. A human sorter picks an object from an incoming bin, finds a barcode on the object, scans the barcode with a handheld barcode scanner, determines from the scanned barcode the appropriate bin or shelf location for the article, and then places the article in the so-determined bin or shelf location where all objects for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

In conventional parcel sortation systems, human workers or automated systems typically retrieve objects in an arrival order, and sort each object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not always most efficient.

Certain partially automated sortation systems involve the use of recirculating conveyors and tilt trays, where the tilt trays receive objects by human sortation (human induction), and each tilt tray moves past a scanner. Each object is then scanned and moved to a pre-defined location assigned to the object. The tray then tilts to drop the object into the location. Further, partially automated systems, such as the bomb-bay style recirculating conveyor, involve having trays open doors on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; they then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not ID an object and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations to total number of system bins. The system is simply diverting an equal share of the total objects to each parallel manual cell. Thus, each parallel sortation cell must have all the same collection bin designations; otherwise an object might be delivered to a cell that does not have a bin to which that object is mapped. There remains a need for a more efficient and more cost-effective object sortation system that sorts objects of a variety of sizes and weights into appropriate collection bins or trays of fixed sizes, yet is efficient in handling objects of such varying sizes and weights.

SUMMARY

In accordance with an embodiment, the invention provides a semi-autonomous processing system for processing objects. The semi-autonomous processing system includes an input conveyance system for moving objects to a presentation area, a perception system including perception units that are directed toward a detection area for providing perception data regarding an object in the presentation area, at least two transport systems, each of which is adapted to receive the object and move the object in either of reciprocal directions, and a manual workstation area between the perception area the at least two transport systems.

In accordance with another embodiment, the invention provides a semi-autonomous processing system for processing objects. The semi-autonomous processing system includes an input conveyance system for moving objects to a presentation area, a perception system including perception units that are directed toward a detection area for providing perception data regarding an object in the presentation area, and at least two transport systems, each of which is adapted to receive the object and move the object in either of reciprocal directions, wherein the semi-autonomous system includes no automated system for moving the object from the presentation area to either of the two transport systems.

In accordance with a further embodiment, the invention provides a method for providing semi-autonomous processing of objects. The method includes the steps of moving objects on an input conveyance system to a presentation area, providing perception data regarding an object in the presentation area, receiving the object in one of at least two transport systems, and moving the object in either of reciprocal directions, wherein the method includes no automated system for moving the object from the perception area to either of the two transport systems.

BRIEF DESCRIPTION OF THE DRAWINGS

The following description may be further understood with reference to the accompanying drawings in which.

The drawings are shown for illustrative purposes only.

DETAILED DESCRIPTION

Processing objects in a distribution center (e.g., sorting) is one application for automatically identifying and moving objects. In a shipping distribution center for example, objects commonly arrive in trucks, are conveyed to sortation stations where they are processed, e.g., sorted, according to desired destinations, aggregated in bags, and then loaded in trucks for transport to the desired destinations. Another application may be in the shipping department of a retail store or order fulfillment center, which may require that objects be processed for transport to different shippers, or to different distribution centers of a particular shipper. In a shipping or distribution center the objects may take form of plastic bags, boxes, tubes, envelopes, or any other suitable container, and in some cases may also include objects not in a container. In a shipping or distribution center the desired destination is commonly obtained by reading identifying information printed on the object or on an attached label. In this scenario the destination corresponding to identifying information is commonly obtained by querying the customer's information system. In other scenarios the destination may be written directly on the object, or may be known through other means.

Applicants have discovered that when automating sortation of objects, there are a few main things to consider: 1) the overall system throughput (objects sorted per hour), 2) the number of diverts (i.e., number of discrete locations to which an object can be routed), 3) the total area of the sortation system (square feet), and 4) the annual costs to run the system (man-hours, electrical costs, cost of disposable components).

In accordance with various embodiments, therefore, the invention provides a method of taking individual objects from an organized or disorganized stream of objects, providing a generally singulated stream of objects, identifying individual objects, and processing them to desired destinations. The invention further provides methods for identifying an object being processed by a human worker, for conveying objects from one point to the next, and for transferring objects from one conveyance system to another for placement at destination locations.

Figure 1:
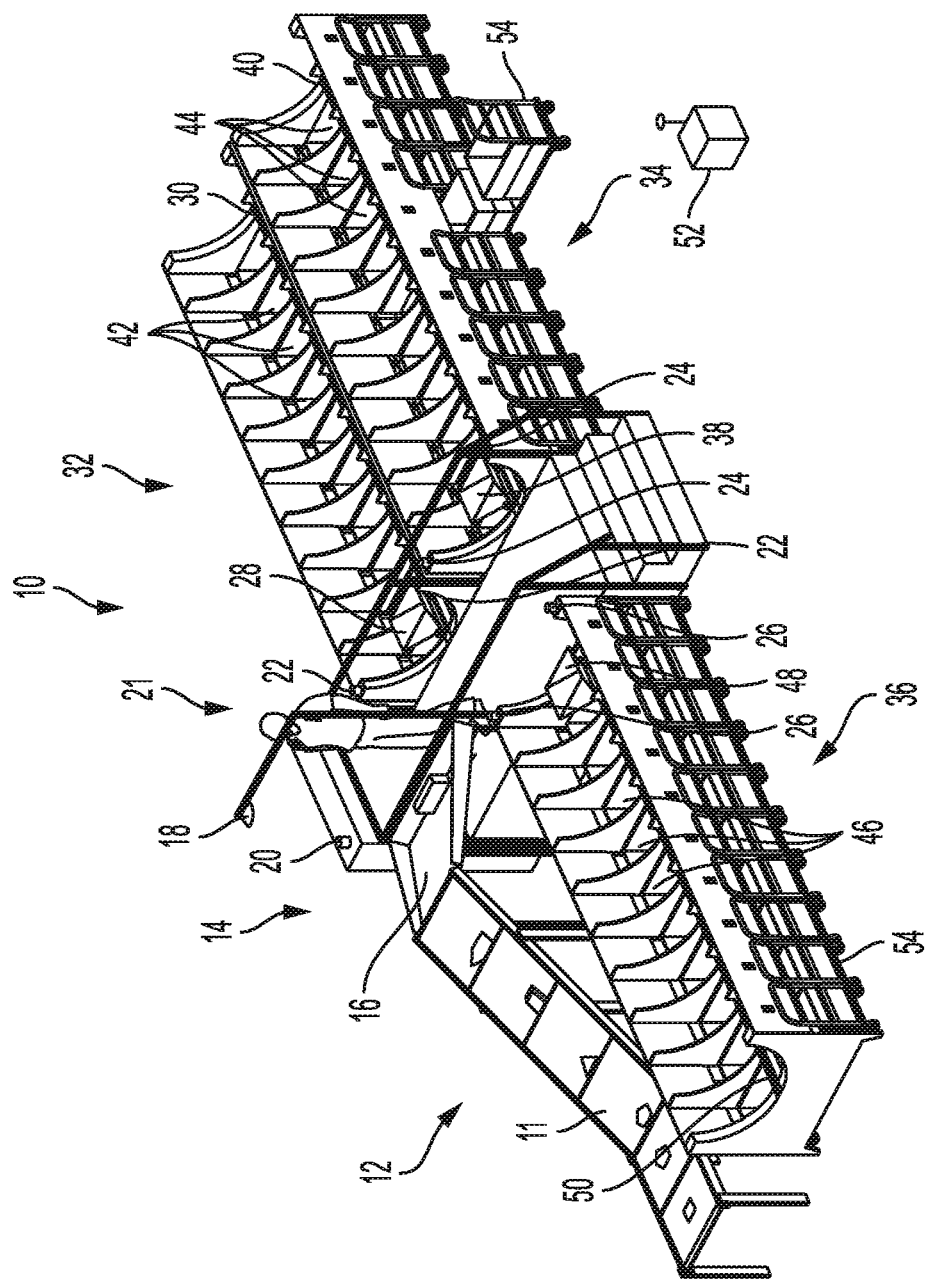
FIG. 1 shows an illustrative diagrammatic view of a semi-autonomous processing system in accordance with an embodiment of the present invention.

Important components of a semi-automated object identification and processing system, in accordance with an embodiment of the present invention, include an input conveyance system, a perception system, a primary transport system, and secondary transport systems. FIG. 1 for example, shows a system 10 that includes an infeed area 12 into which objects may be provided. The objects may be provided as a generally singulated stream of objects by a programmable motion device, or by having an inclined cleated conveyor draw a stream of objects up from a hopper into which objects may have been deposited, e.g., by a dumper or transferred from a Gaylord. An infeed conveyor 11 conveys objects through the infeed area 12 to a processing station 14 that includes a presentation area such as a declining sloped surface 16. The infeed conveyor may include cleats for assisting in lifting the objects from the infeed conveyor to the sloped surface 16.

The system also includes an identification system 18 that includes a depth detection system and a perception system as discussed in more detail below. Generally, a human worker in a workstation area 21 lifts an object from the sloped surface 16, and once the object is identified (as optionally indicated by a feedback device 20 such as a light or a speaker), a pair of lights (e.g., pair 22, pair 24 or pair 26) is illuminated to show the worker where to place the object. Each pair of lights 22, 24, 26 is associated with a shuttle wing 32, 34, 36 that includes a shuttle carriage 28, 38, 48, that rides on a track 30, 40, 50 between rows of destination bins 42, 44, 46 that may be provided on carts 54. For example, each cart may support two destination bins as shown. Once a pair of lights (22, 24, 26) is illuminated, the human worker places the object in the associated carriage. The system then detects this placement, and moves the shuttle carriage to be adjacent a desired destination bin, and tilts the carriage to drop the object in the bin as discussed in more detail below. Operation of the system may be governed by a processing system 52 that includes one or more computer processing systems.

Figure 2:
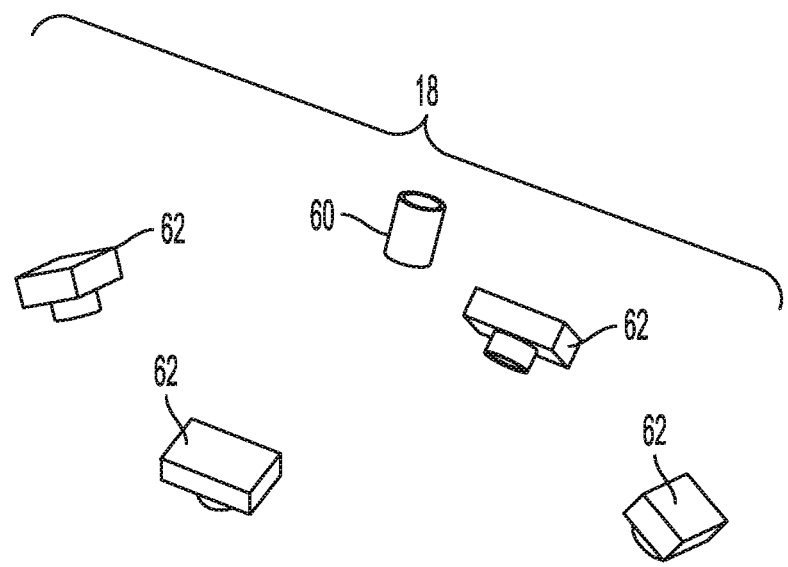
FIG. 2 shows an illustrative diagrammatic view of an identification system of FIG. 1.
Figure 2:
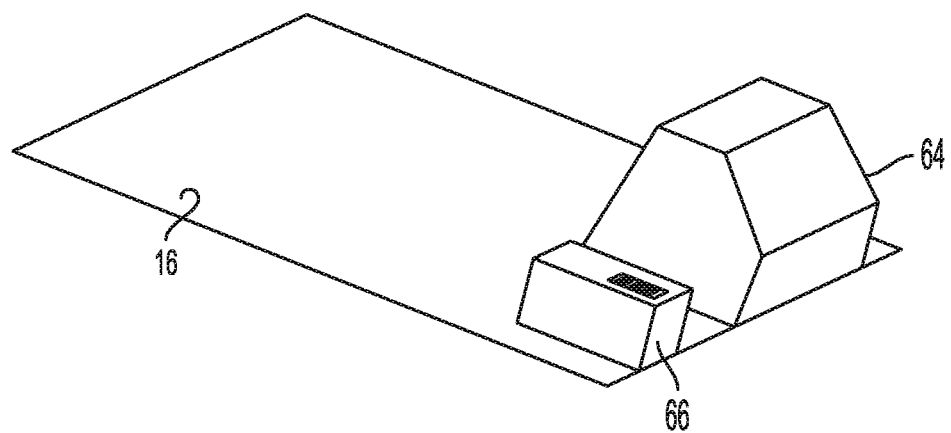
Figure 3:
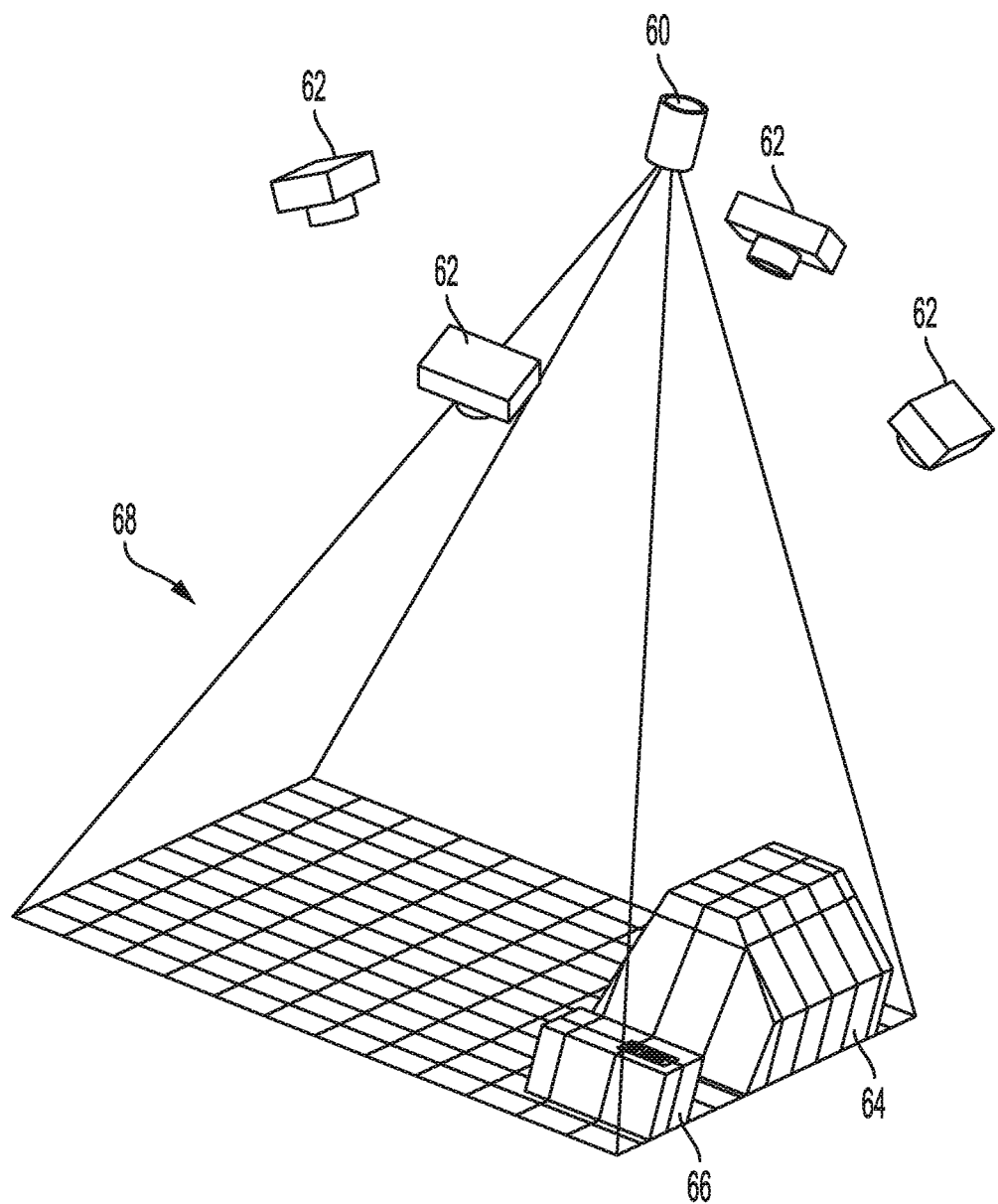
FIG. 3 shows an illustrative diagrammatic view of the identification system of FIG. 2 with the depth detection system engaged.

With reference to FIG. 2, the identification system 18 includes a depth detection system 60 and a plurality of perception units 62 that are generally directed toward the sloped surface 16. As discussed in more detail below with reference to FIG. 8, when the identification system 18 senses any motion, the system will scan the area of the sloped surface 16 as shown in FIG. 3. The identification system 18 may detect motion using a beam brake sensor near the bottom of the sloped surface, or may be provided by the depth detection system 60. Once triggered, the depth detection system 60 will conduct a 3D depth scan of the area, which presumably includes one object 64 and may include more than one object 66 (for example, if the cleated conveyor brought two objects up in one cleated section, or if the worker replaced an object back on the sloped surface 16).

Figure 4:
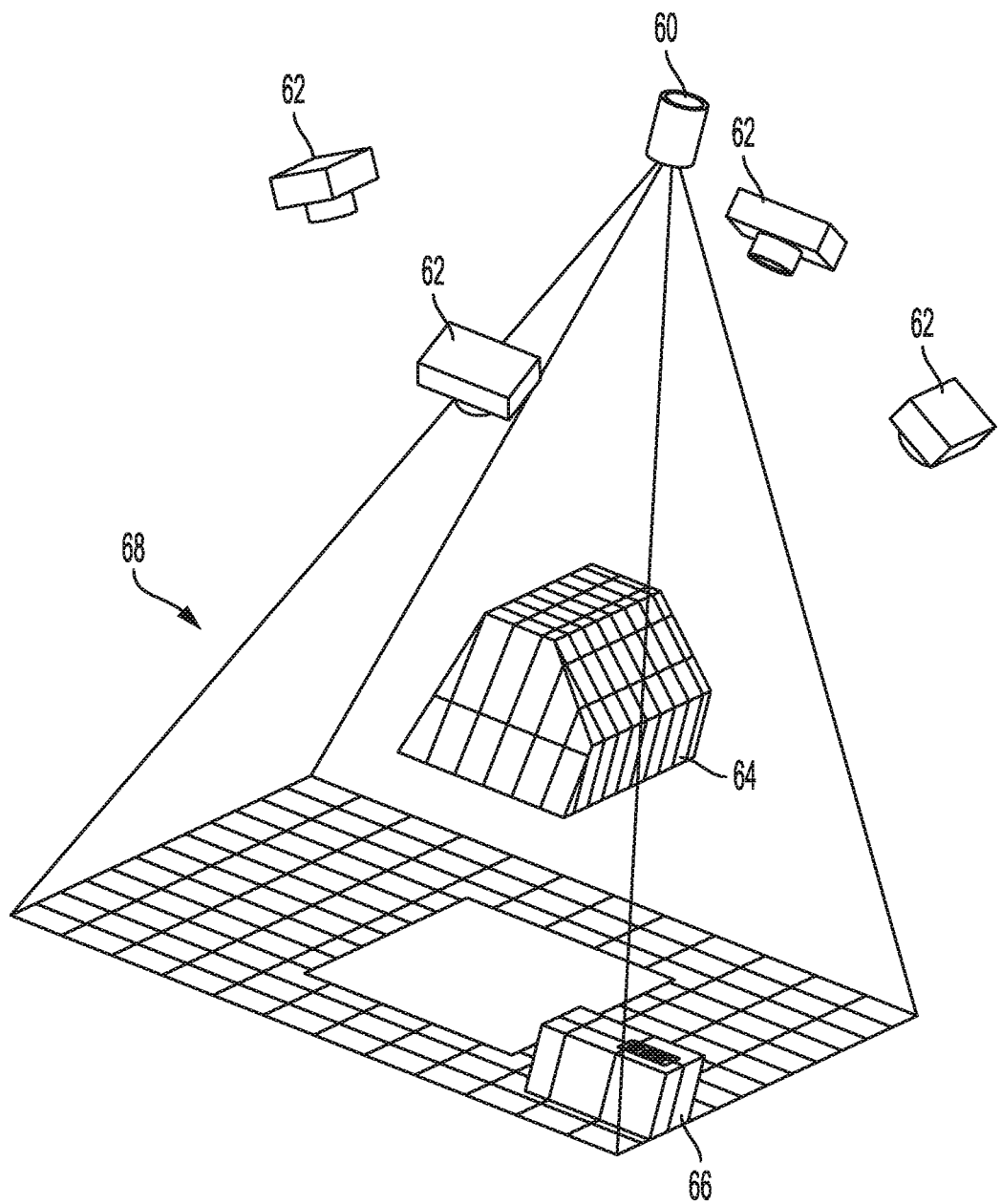
FIG. 4 shows an illustrative diagrammatic view of the system of FIG. 3 with an object being moved closer to the detection system.
Figure 5:
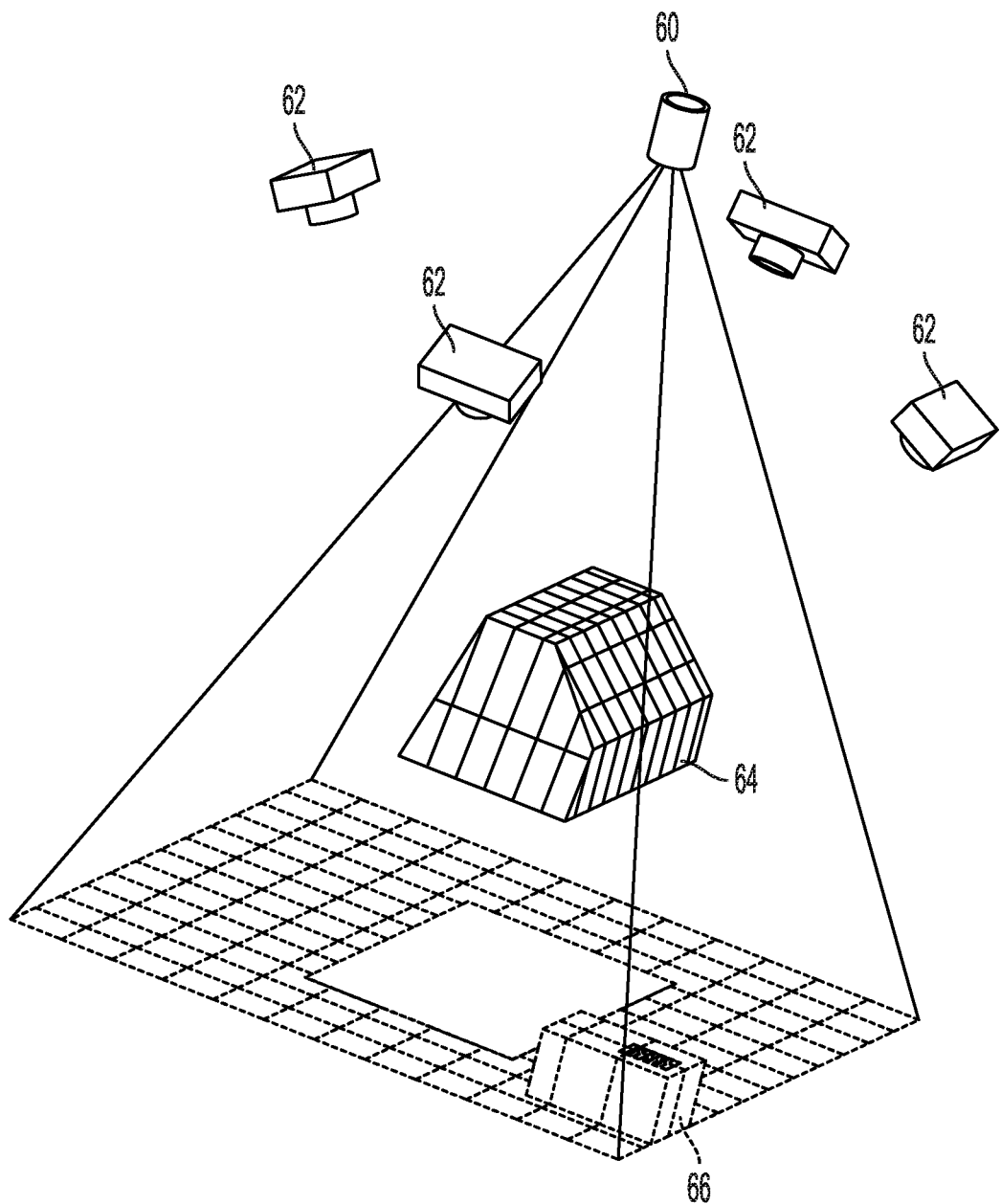
FIG. 5 shows an illustrative diagrammatic view of the system of FIG. 4 with non-object areas of the field of view being excluded.

The system will then continue to scan the field until it detects an object has been lifted from the sloped surface 16 and is being moved closer to the detection system 60 as shown in FIG. 4. The significance of this is that the system will thereby isolate an object that a human worker has lifted and thereby selected for processing. At this time, the system will concentrate on the area of the object identified as being lifted, and thereby exclude other areas of the field of view as shown diagrammatically in FIG. 5. In particular, the object 64 is identified as being lifted, and the system will exclude other areas of view, which includes another object 66 even though an indicia label is visible on the object 66 while none is yet visible on the object 64.

Figure 6:
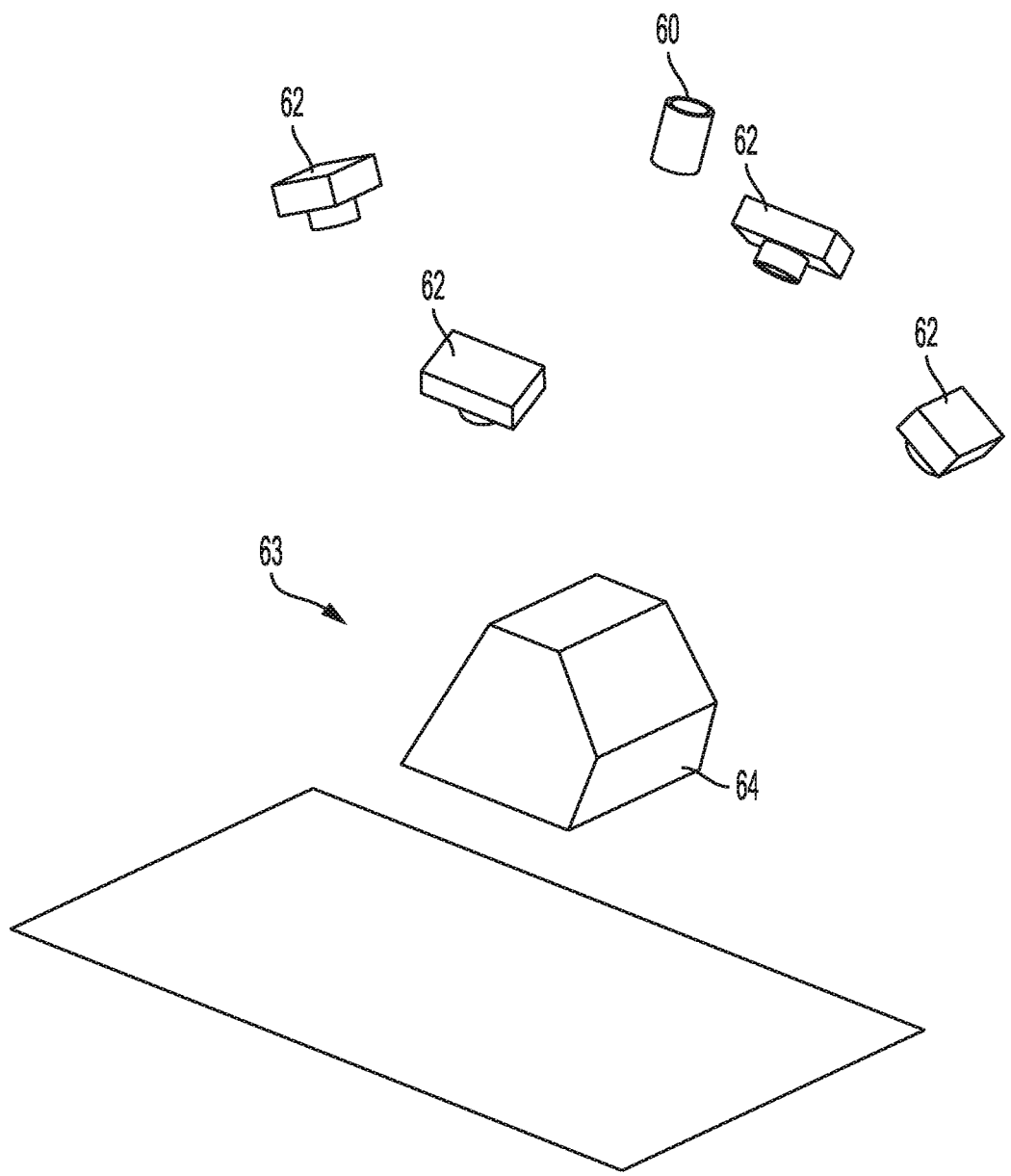
FIG. 6 shows an illustrative diagrammatic view of the system of FIG. 5 with the view of the object being maintained.
Figure 7:
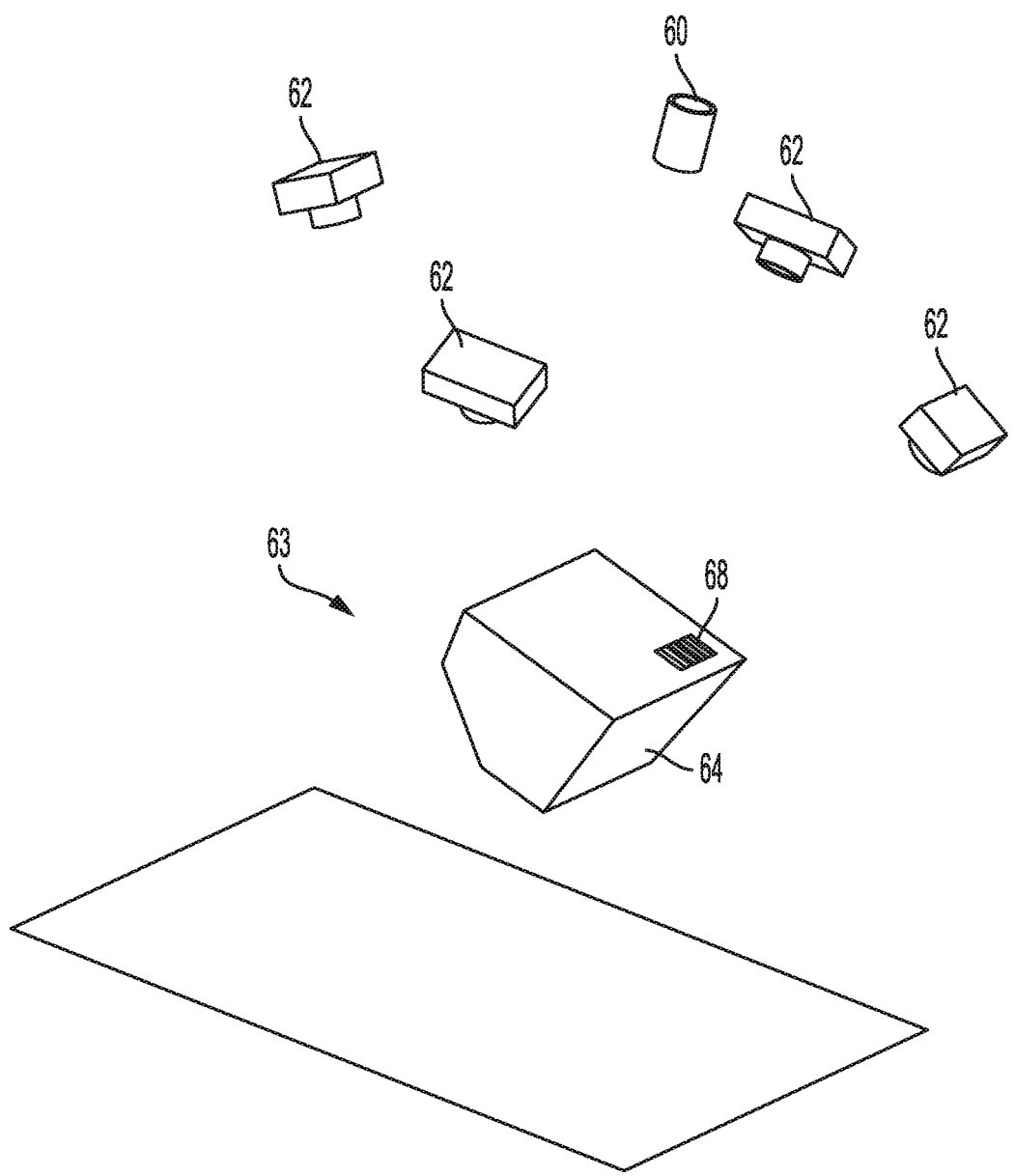
FIG. 7 shows an illustrative diagrammatic view of the system of FIG. 6 with the object having been rotated.

Once the area of the object 64 is identified, the system will then maintain a view of this perception area 63 of the object 64 as shown in FIG. 6 until identifying indicia is perceived or the object 64 is removed from view. In particular, if identifying indicia is not facing the perception units 62, the human worker may rotate the item as shown in FIG. 7 until identifying indicia 68 is detected by the perception units 62. In this way, a human worker may lift an object and rotate the object if needed until the system detects identifying indicia. Once the system identifying indicia is detected, the feedback system 20 can prompt the worker to move the object to an identified processing location.

In addition to indicating when an identifying indicia is detected, the feedback system 20 can provide other information to the worker, such as an indication that the system has isolated a lifted object and is searching for an identifying indicia, a status indicator showing that more than one object is present in the presentation area 16, or an indication that the lifted object has been removed from the presentation area 16. These indications can be through a color changing light, a series of lights aligned with respective text, a display screen, a projection on the presentation area, auditory cues, or a combination thereof. While the feedback system 20 is shown in FIG. 1 to be to the side of the worker, one or more portions or functionalities of the feedback system 20 may be located adjacent to the identification system 18.

An important aspect of certain embodiments of the present invention, is the ability to identify via barcode or other visual markings of objects by employing a perception system that may quickly scan the object as held by a human worker. Automated scanning systems would be unable to see barcodes on objects that are presented in a way that their barcodes are not exposed or visible without rotation. The system therefore is designed to view an object from a large number of different views very quickly, reducing or eliminating the possibility of the system not being able to view identifying indicia on an object.

It is also proposed that key features in the perception system are the specific design of the perception system so as to maximize the probability of a successful scan, while simultaneously minimizing the average scan time. The probability of a successful scan and the average scan time make up key performance characteristics. These key performance characteristics are determined by the configuration and properties of the perception system, as well as the object set and how they are marked. The key performance characteristics may be optimized for a given item set and method of labeling. Parameters of the optimization for a system include how many scanners, where and in what orientation to place them, and what sensor resolutions and fields of view for the scanners to use. Optimization can be done through trial and error, or by simulation with models of the object.

Optimization through simulation may employ a scanner performance model. A scanner performance model provides the range of positions, orientations and barcode element size that an identifying symbol can be detected and decoded by the scanner, where the barcode element size is the size of the smallest feature on the symbol. These are typically rated at a minimum and maximum range, a maximum skew angle, a maximum pitch angle, and a minimum and maximum tilt angle.

Performance requirements for such camera-based scanners are that they are able to detect symbols within some range of distances as long as both pitch and skew of the plane of the symbol are within the range of plus or minus 45 degrees, while the tilt of the symbol can be arbitrary (between 0 and 360 degrees). The scanner performance model predicts whether a given symbol in a given position and orientation will be detected.

The scanner performance model is coupled with a model of where symbols would expect to be positioned and oriented. A symbol pose model is the range of all positions and orientations, in other words, poses in which a symbol will expect to be found. For the scanner, the symbol pose model is itself a combination of an article gripping model, which predicts how objects will be held by the robotic system, as well as a symbol-item appearance model, which describes the possible placements of the symbol on the object. For the scanner, the symbol pose model is itself a combination of the symbol-item appearance model, as well as an inbound-object pose model, which models the distribution of poses over which inbound articles are presented to the scanner. These models may be constructed empirically, modeled using an analytical model, or approximate models may be employed using simple sphere models for objects and uniform distributions over the sphere as a symbol-item appearance model.

Figure 8:
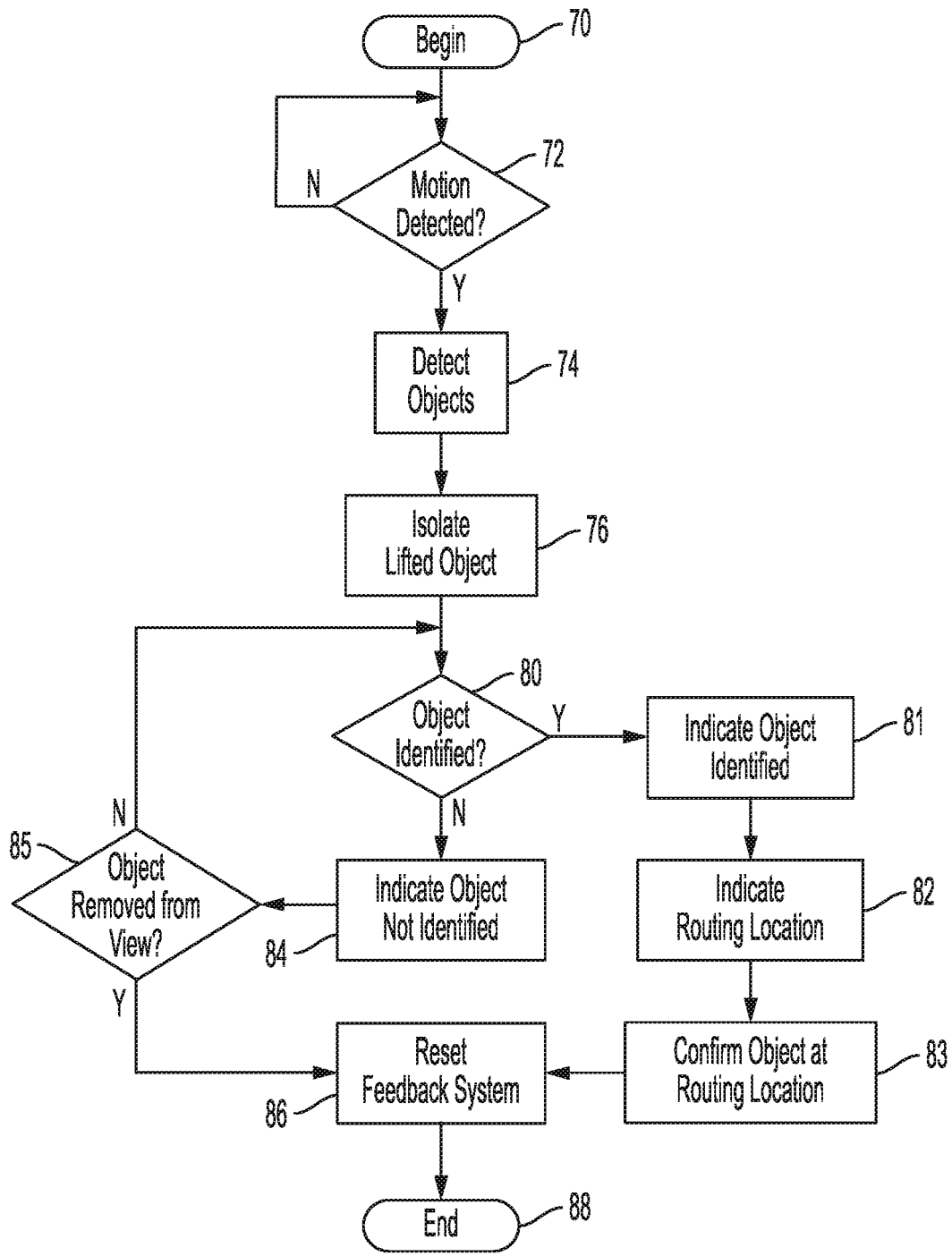
FIG. 8 shows an illustrative diagrammatic flowchart of the detection processing in accordance with an embodiment of the invention.

With reference to FIG. 8, the detection process in accordance with an embodiment begins (step 70) and the system uses the identification system 18 to determine whether any motion is detected (step 72), e.g., by noting any change in consecutively obtained data. Once motion is detected, the system will detect objects in the presentation area 16 (step 74), e.g., by using edge detection techniques, volumetric or topographical scans, etc. This step allows the system to isolate and track individual objects, as well as identifying and discarding non-object motion data, such as operator movements. The identification system 18 can, at this point, attempt to engage the perception units 62 to capture identifying indicia on detected objects and gather information from the system or indicia associated with the identified objects. Once one or more objects have been detected, the depth detection system 60 continues to monitor the presentation area 16 to determine whether any object is moving from a surface of the presentation area 16 toward the detection system 60, and if so, to isolate that object for further processing (step 76). Once an object is determined to be moving toward the detection system 60, for example because a person is lifting the object, the system will determine whether the object has been identified, and if not, will continue to engage the perception units 62 to try to capture any identifying indicia on the object (step 80).

The feedback system 20 indicates the status of the pick to the worker through audio or visual cues. For example, distinct cues can be provided for when motion is detected, when one object has been detected, when multiple objects are detected, when the identity of an object is detected (which can indicate which object is identified, for example, by projecting a light onto the object, or using speech to identify the object), when an object is lifted, and where to route a lifted object if it has been identified. If any identifying indicia is found, the system will indicate that the object has been identified (step 81), indicate a routing location for the object by, for example, illuminating a pair of wing location lights and prompting the human worker to move the object to the carriage of the associated wing location (step 82). In certain embodiments, the system confirms that the object has been placed in the routing location, for example, with beam breaks or force sensors on the carriage (step 83). Once the object is confirmed to be at the routing location, the feedback system is reset (step 86), and the process can end (step 88). If, after a predetermined amount of time, the object is not confirmed to be at the routing location, the feedback system 20 can indicate an error, and the process will halt until the worker resolves the error, either by placing the object in the routing location or otherwise updating the system with the status of the object (e.g. damaged, sent to manual sortation, reintroduced to input area, lost, etc.).

The feedback system can also instruct or otherwise indicate to a worker that the object has not yet been identified (step 84), and other areas of the object need to be presented to the perception units 62, such as by turning the object or flattening the indicia, in order to capture the identifying indicia. The system will maintain a view of the general area of the object to permit this rotation. The process continues to loop until either the object is removed from the view (step 85), or any identifying indicia is found and the process continues to step 81. If the object is removed from view (for example, if placed in a manual sortation location, or in some embodiments, if placed back onto the surface of the presentation area 16), the feedback system will be reset, and the process will end.

Once the process is ended, the infeed conveyor can advance and provide the presentation area with another object, and the process can begin again. In some cases, as later discussed with reference to FIG. 19, a main routing location may not be available at a given time, and the process could indicate to the worker to place the object at a holding location until a main routing location becomes available. A main routing location can become available after the process of FIG. 8 ends if, for example, the last object placed at its routing location fulfills an order, and is removed for further processing, allowing a location to be available for another object. Once a new routing location is available, the feedback system 20 can inform the worker that an object is in the holding area before providing another object to the presentation area 16.

Figure 9:
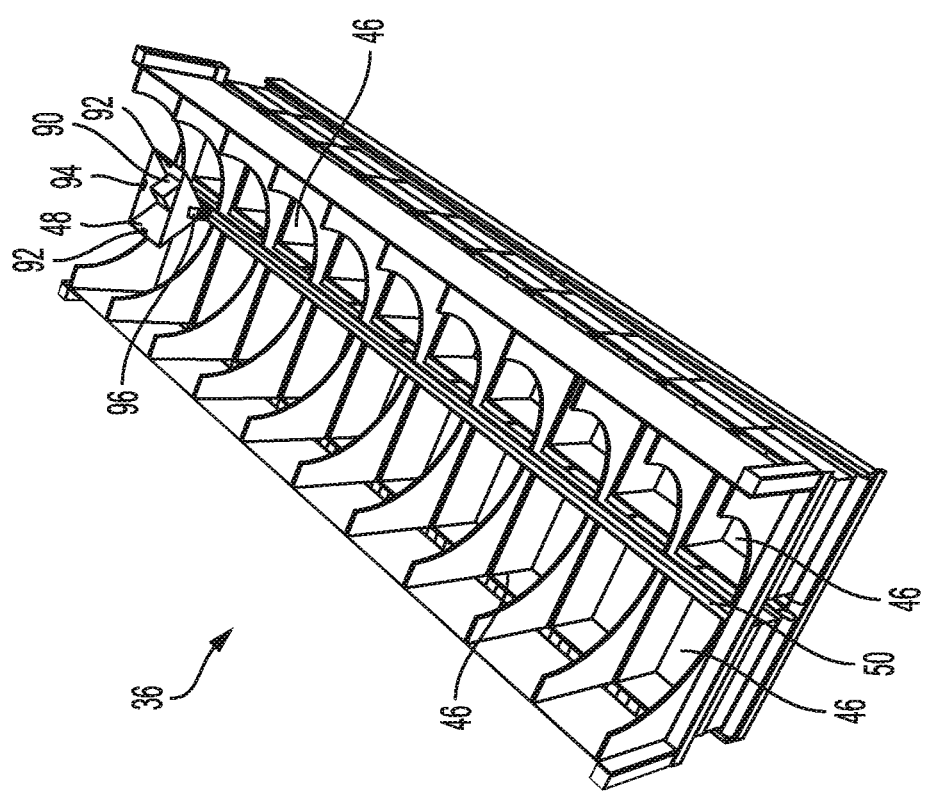
FIG. 9 shows an illustrative diagrammatic view of a shuttle wing section for use in a semi-autonomous processing system in accordance with an embodiment of the present invention.
Figure 10:
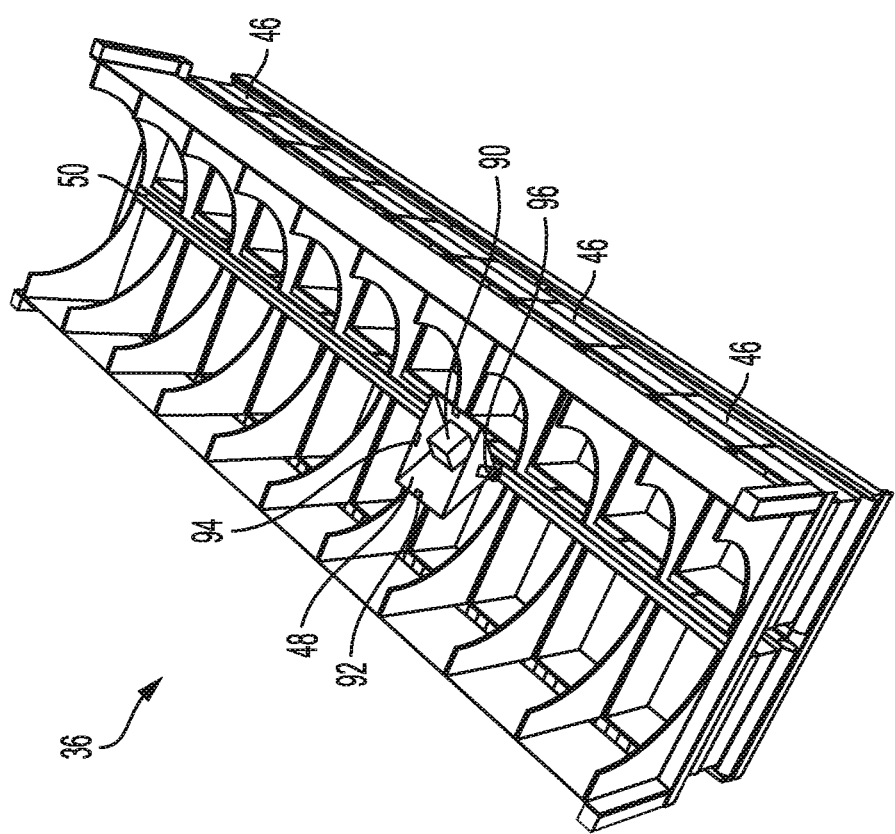
FIG. 10 shows an illustrative diagrammatic view of the shuttle wing section of FIG. 9 with the carriage moved along its track.
Figure 11:
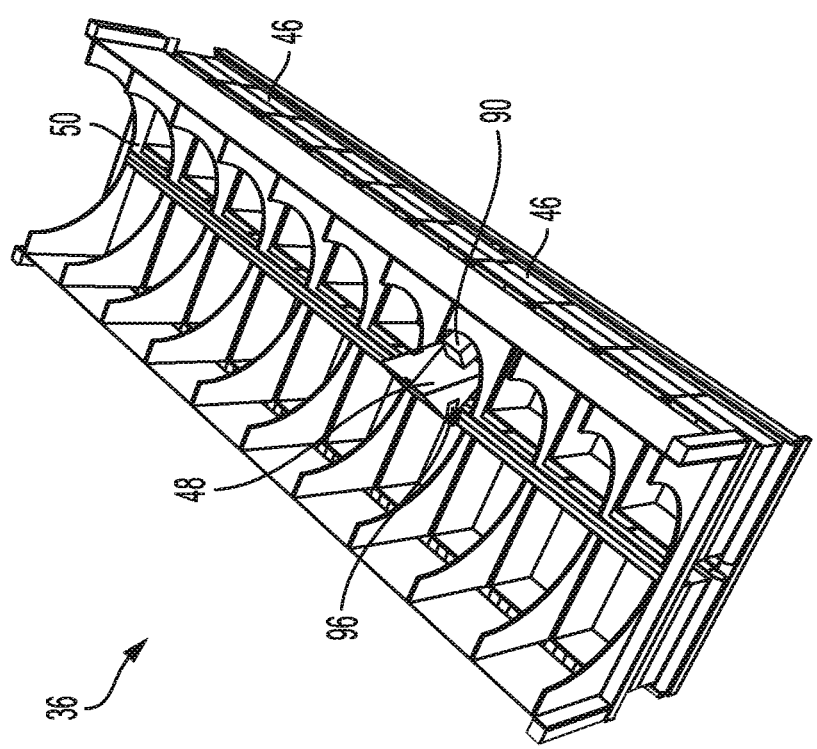
FIG. 11 shows an illustrative diagrammatic view of the shuttle wing section of FIG. 10 with the carriage dropping an object into a destination location.

As referred to above in connection with step 83, carriage (e.g., 28, 38, 48) may include beam break sensors 92, 94 as shown in FIG. 9, and/or may optionally include a force torque sensor 96 for detecting a weight of an object in the carriage, to determine both when an object is received by the carriage and to confirm that an object has been dumped by the carriage into a destination bin. Such a force torque sensor may be positioned between a support structure and the carriage such that the force torque sensor bears the weight of the carriage. FIG. 9 shows a shuttle wing section 36 that includes the carriage 48 bearing an object 90. As further shown in FIG. 10, the carriage 48 is adapted to move along track 50 until it reaches a selected destination location 46, and as shown in FIG. 11, the carriage is adapted to then rotate to dump the object into the destination location. As noted above, the beam break sensors and/or the weight sensor may confirm that the object has been transferred to the destination location.

Figure 12:
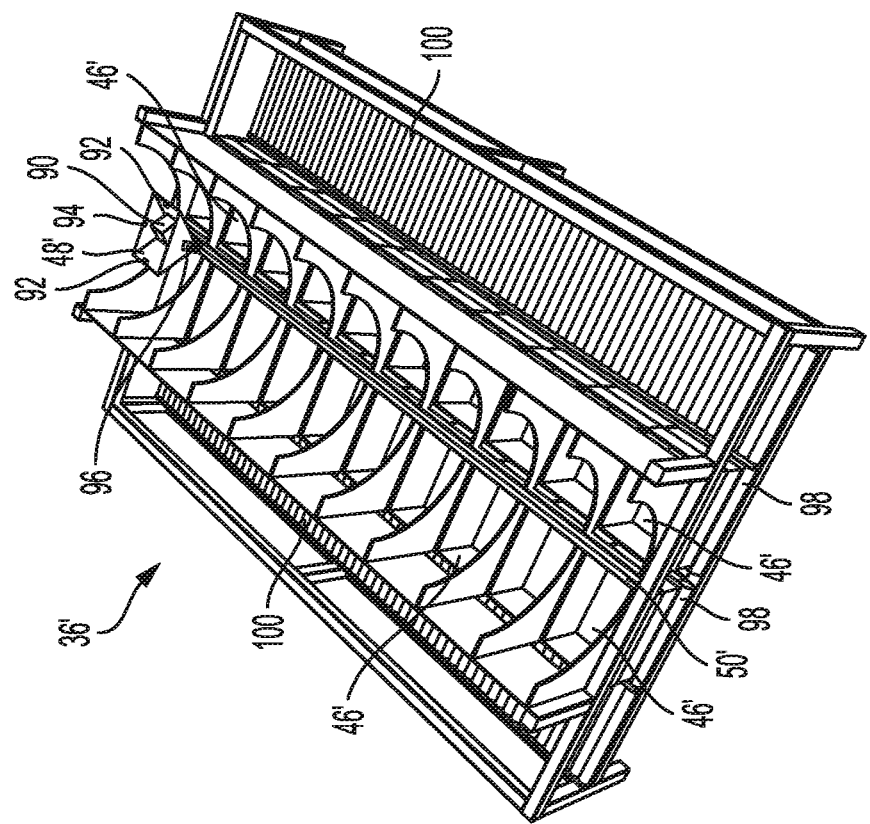
FIG. 12 shows an illustrative diagrammatic view of a shuttle wing section for use in a semi-autonomous processing system in accordance with another embodiment of the present invention.
Figure 13:
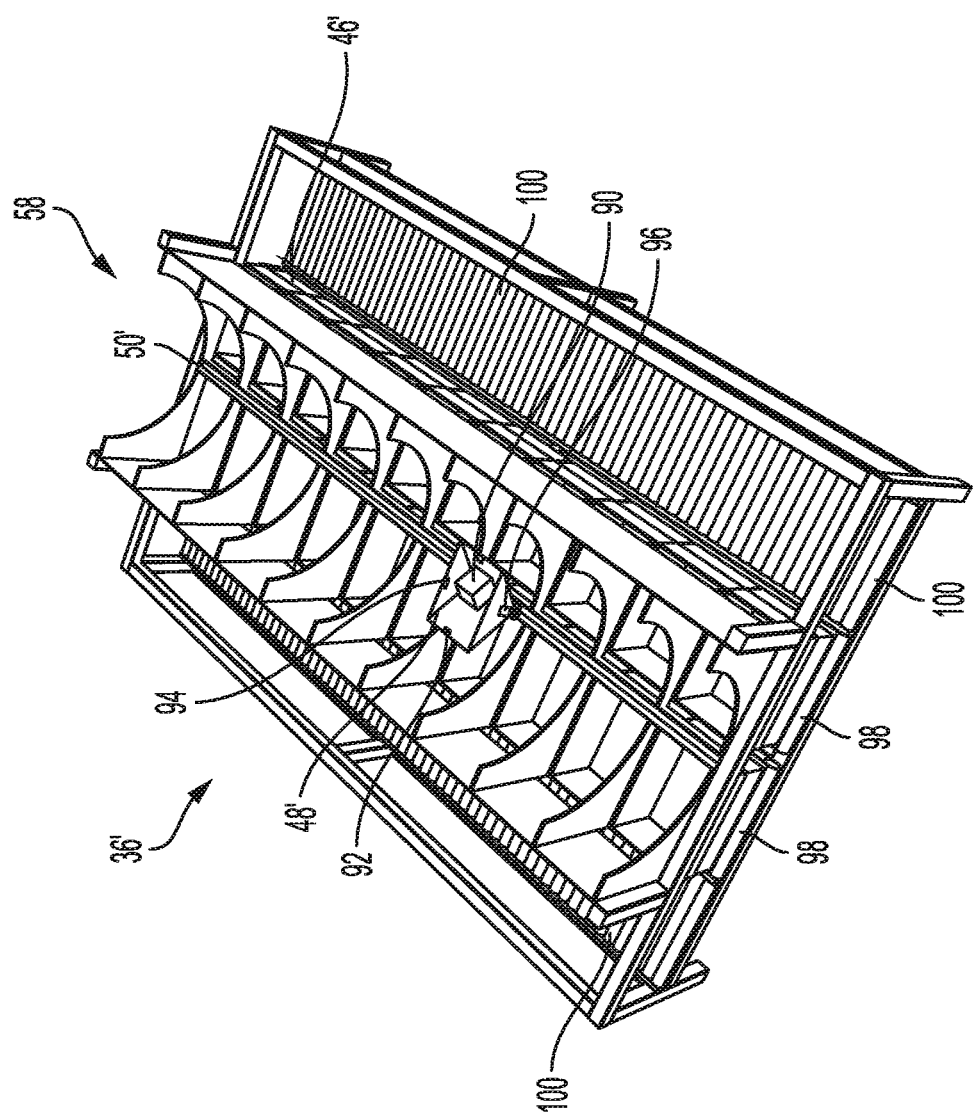
FIG. 13 shows an illustrative diagrammatic view of the shuttle wing section of FIG. 12 with the carriage moved along its track.
Figure 14:
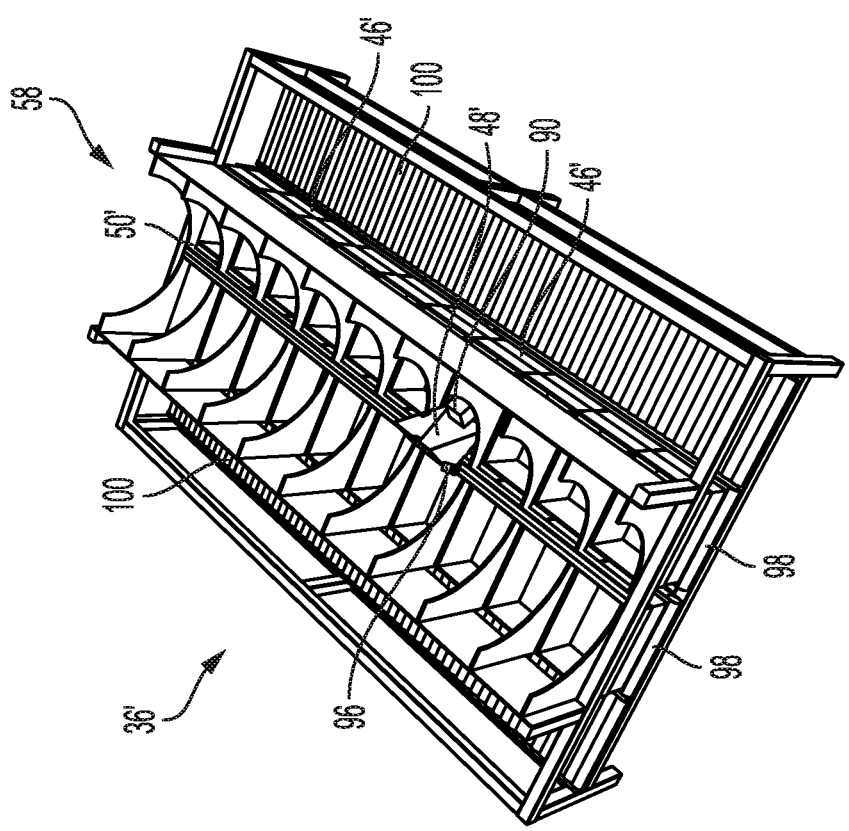
FIG. 14 shows an illustrative diagrammatic view of the shuttle wing section of FIG. 13 with the carriage dropping an object into a destination location.

FIGS. 12-18 show a shuttle wing processing section 36' for use in a system in accordance with a further embodiment of the present invention that includes infeed conveyors 98 and output conveyors 100. In particular, FIG. 12 shows a shuttle carriage 48' that includes beam break sensors 92, 94 and/or weight sensors 96. As discussed above, the shuttle carriage 48' moves along track 50' between destination locations 46' (as shown in FIG. 13), and may be actuated to dump the object 94 into a selected destination location (as shown in FIG. 14). As noted above, the destination locations 46' are provided on infeed conveyors 98 that may be biased (e.g., gravity biased) to urge the destination locations toward one end 58 of the shuttle wing processing section 36'.

Figure 15A:
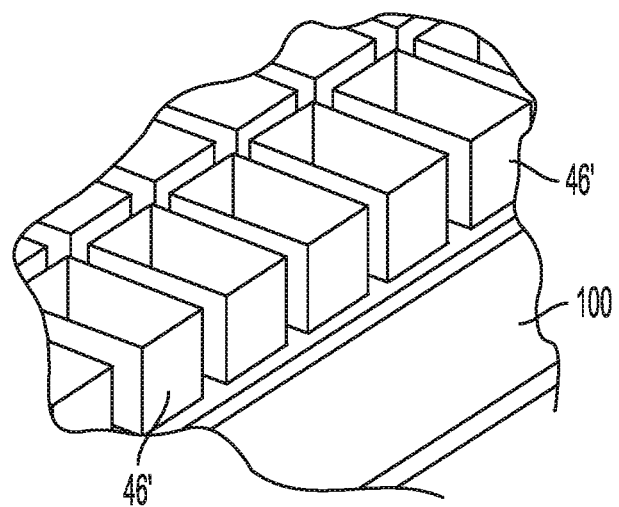
FIGS. 15A and 15B show illustrative diagrammatic views of a bin removal system in accordance with an embodiment of the invention with a bin selected for removal (FIG. 15A) and being removed (FIG. 15B)
Figure 15B:
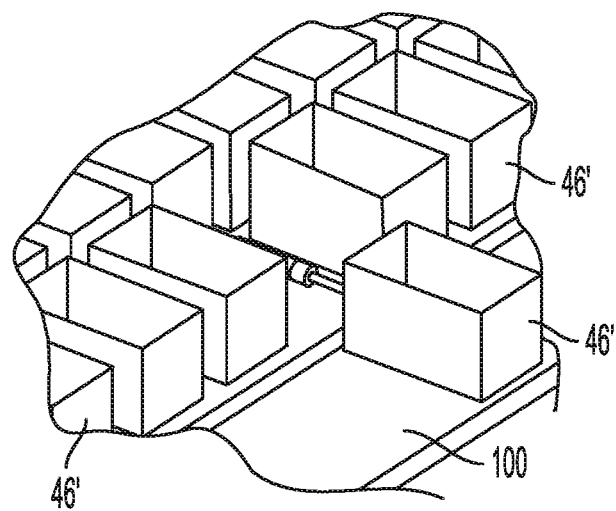
Figure 17:
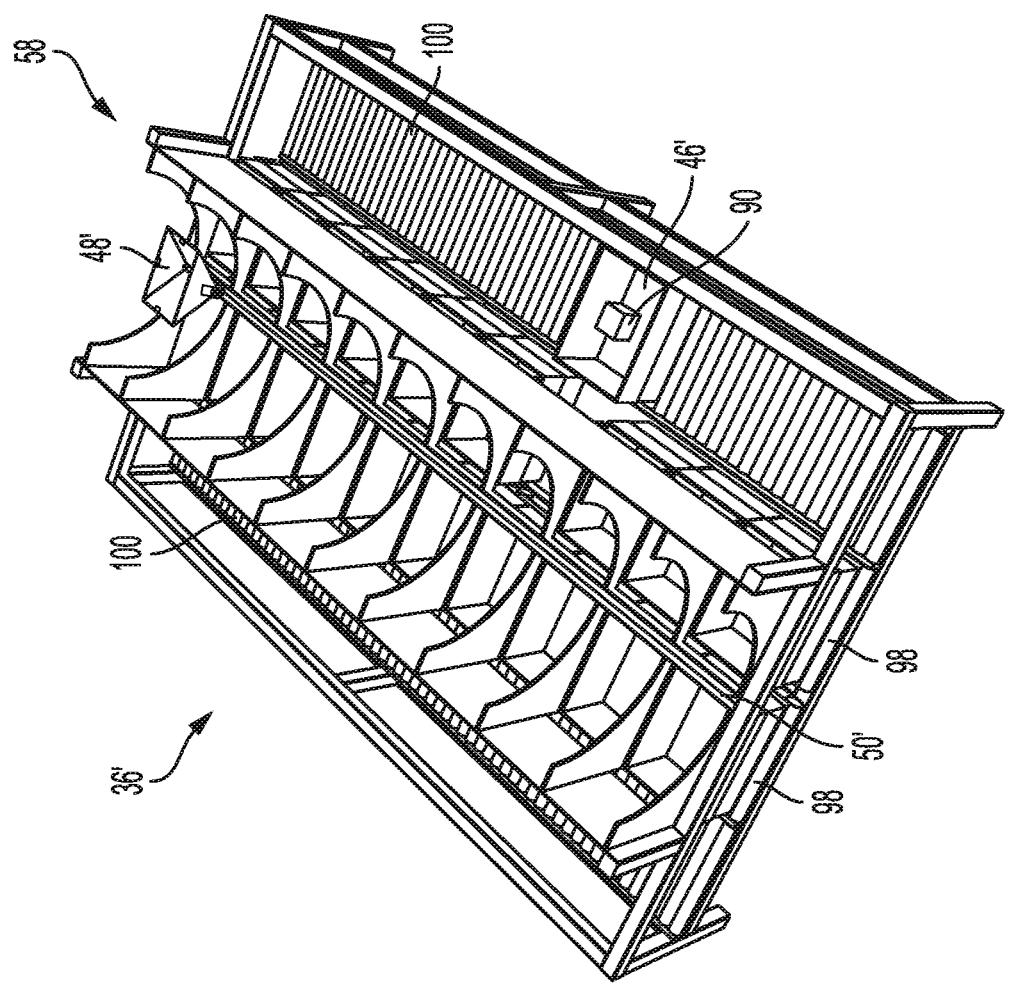
FIG. 17 shows an illustrative diagrammatic view of a bin being displaced onto an output conveyor in accordance with an embodiment of the present invention.
Figure 18:
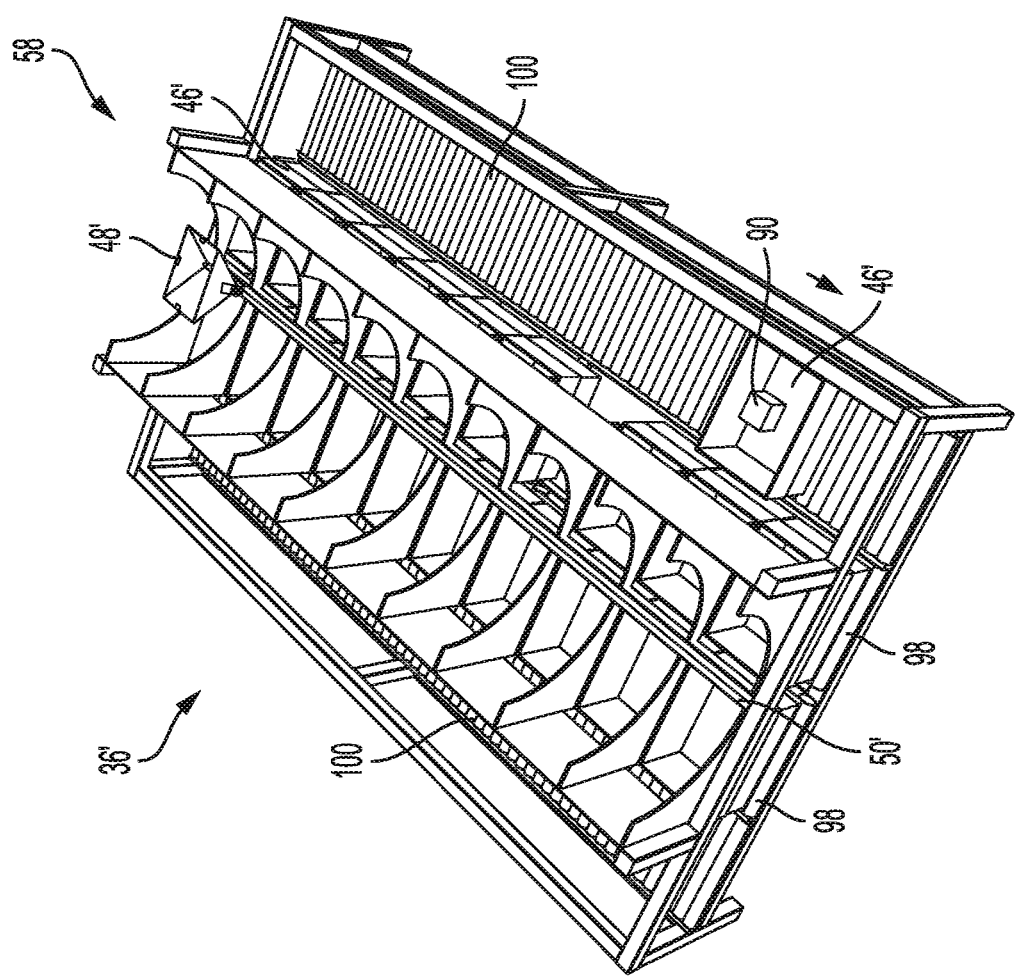
FIG. 18 shows an illustrative diagrammatic view of the bin and output conveyor of FIG. 17 with the bin moved along the output conveyor.

With reference to FIGS. 15A and 15B, when a destination bin 46' is selected for removal (e.g., because the bin is full or otherwise ready for further processing), the system will urge the completed bin onto an output conveyor 100 to be brought to a further processing or shipment station. The conveyor 100 may be biased (e.g., by gravity or power) to cause any bin on the conveyor to be brought to an output location as shown in FIGS. 17 and 18. FIGS. 15A and 15B show a bin being urged from the plurality of destination bins, onto the output conveyor 100 by the use of a displacement mechanism 102. In accordance with further embodiments, other displacement mechanisms may be used. The destination bins may be provided as boxes or containers or any other type of device that may receive and hold an item.

Figure 16A:
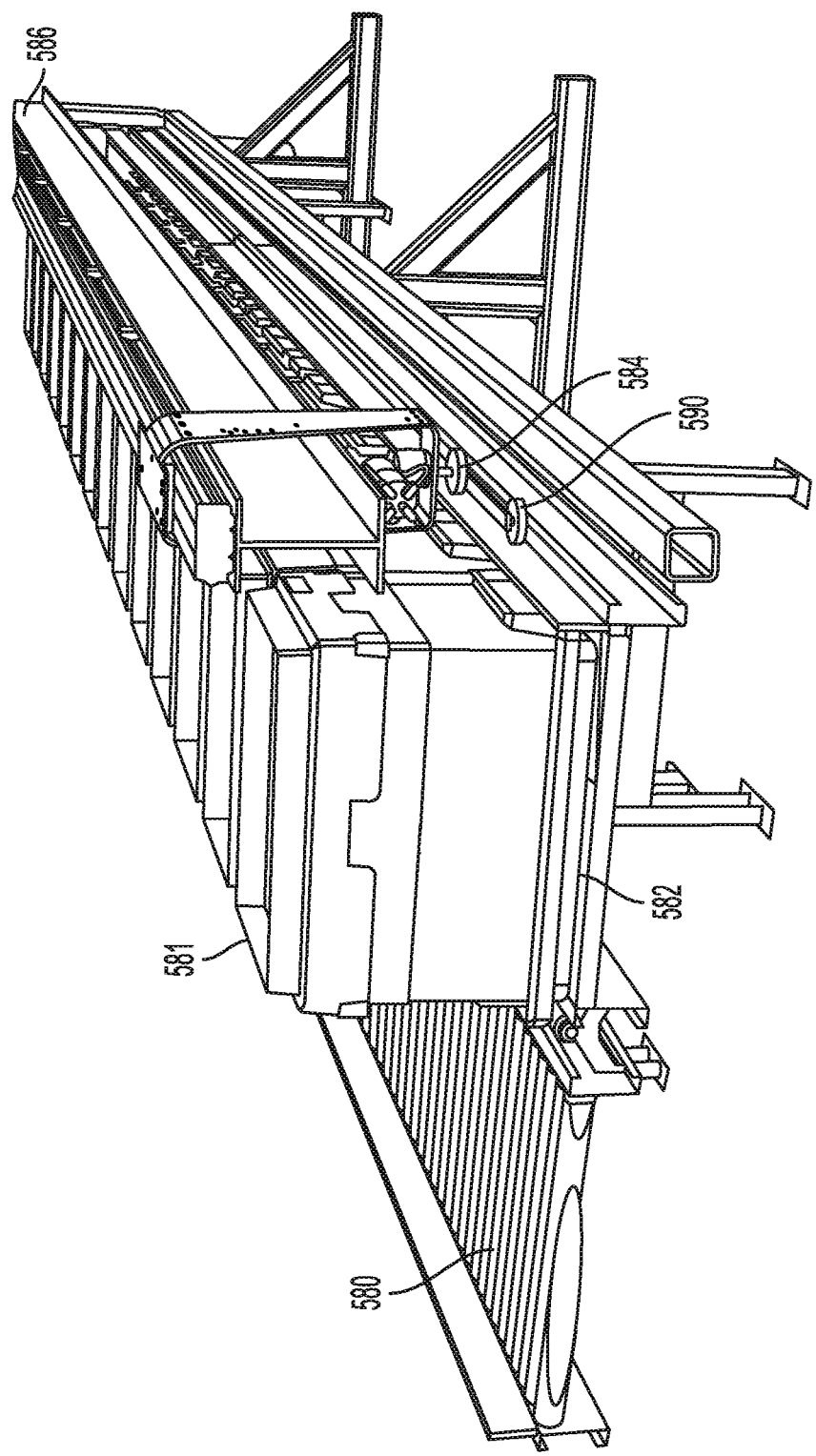
FIGS. 16A-16D show illustrative diagrammatic views of a further embodiment of a bin displacement system for use in further embodiments of the invention.
Figure 16B:
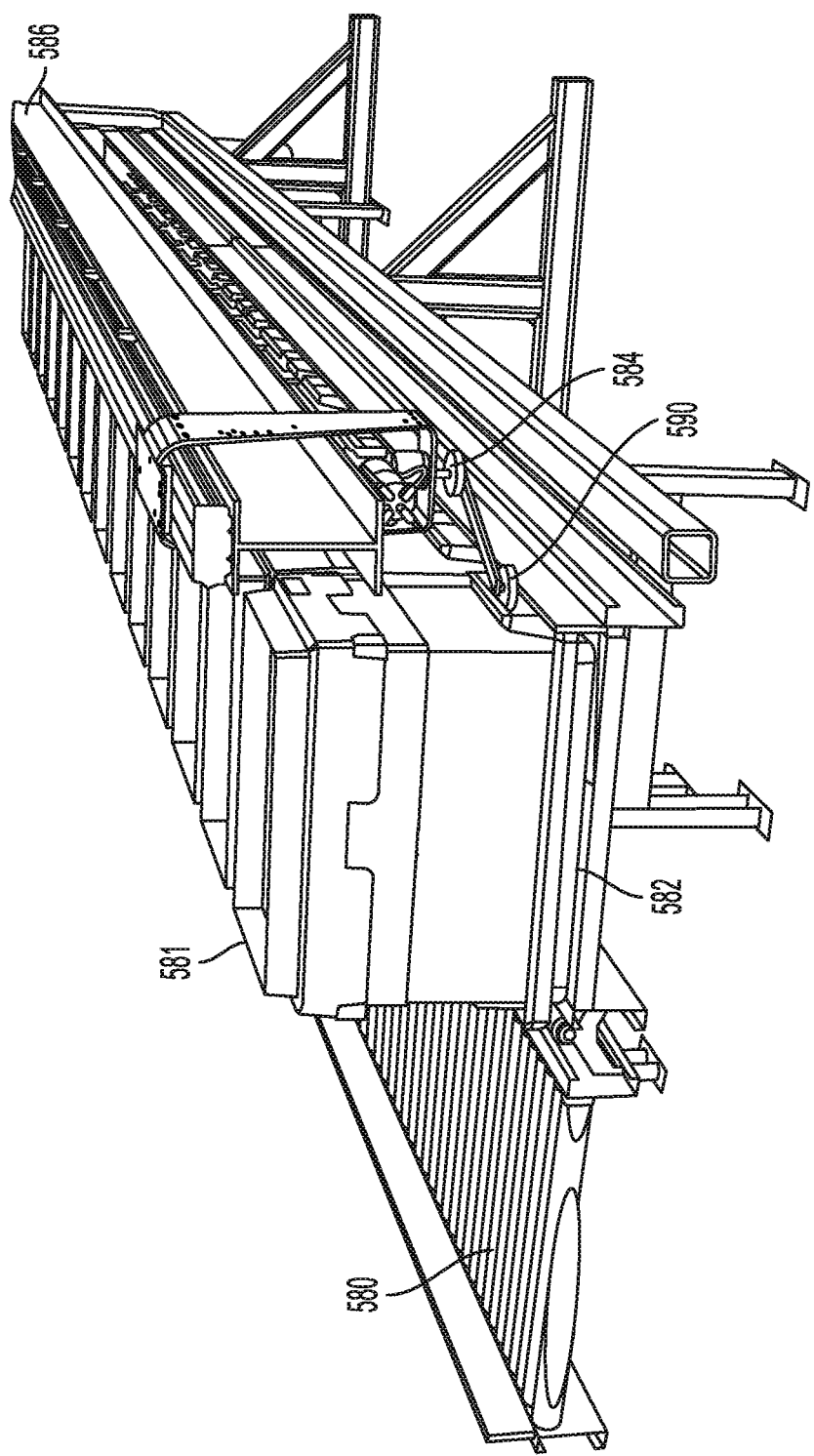
Figure 16C:
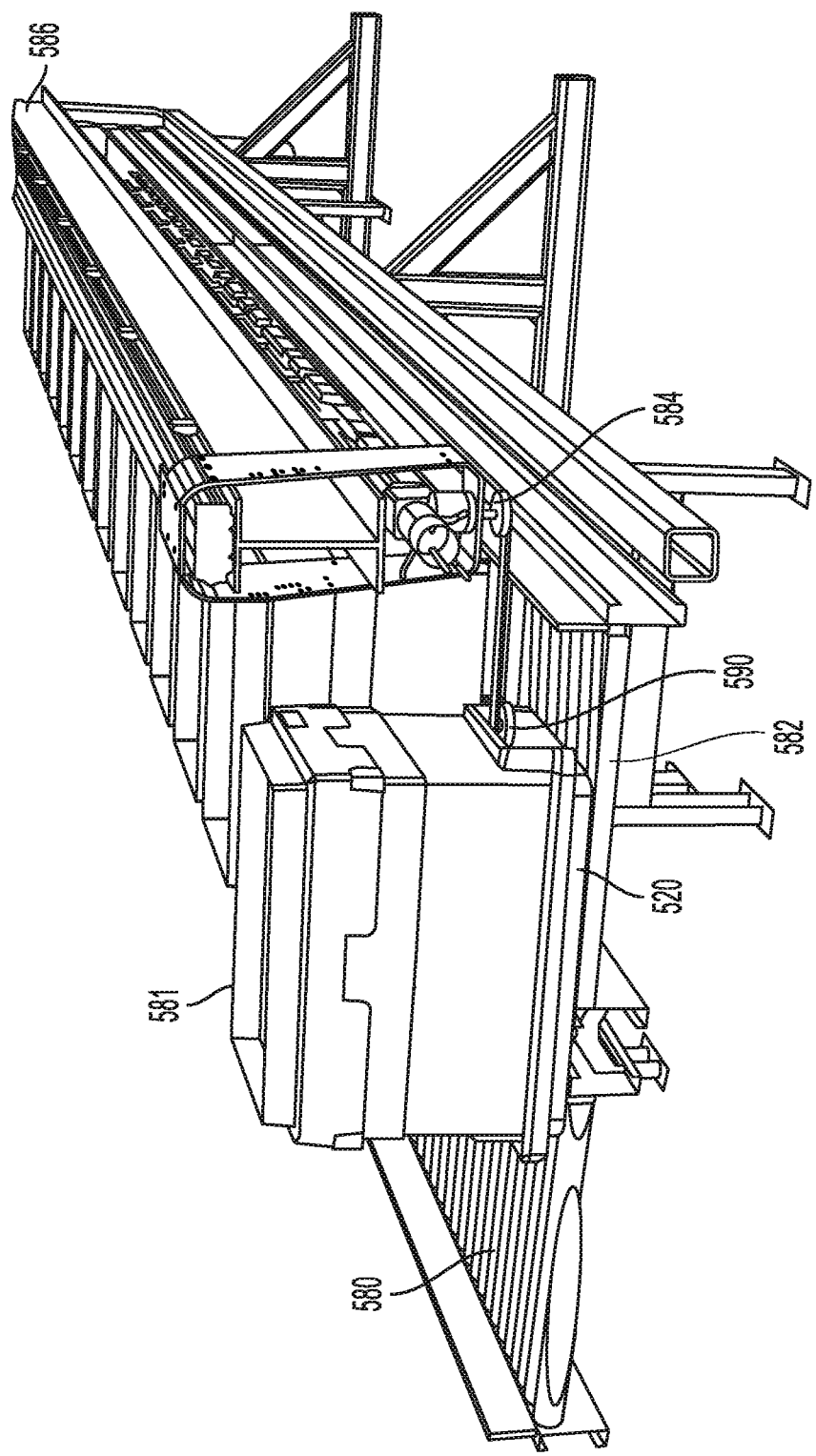
Figure 16D:
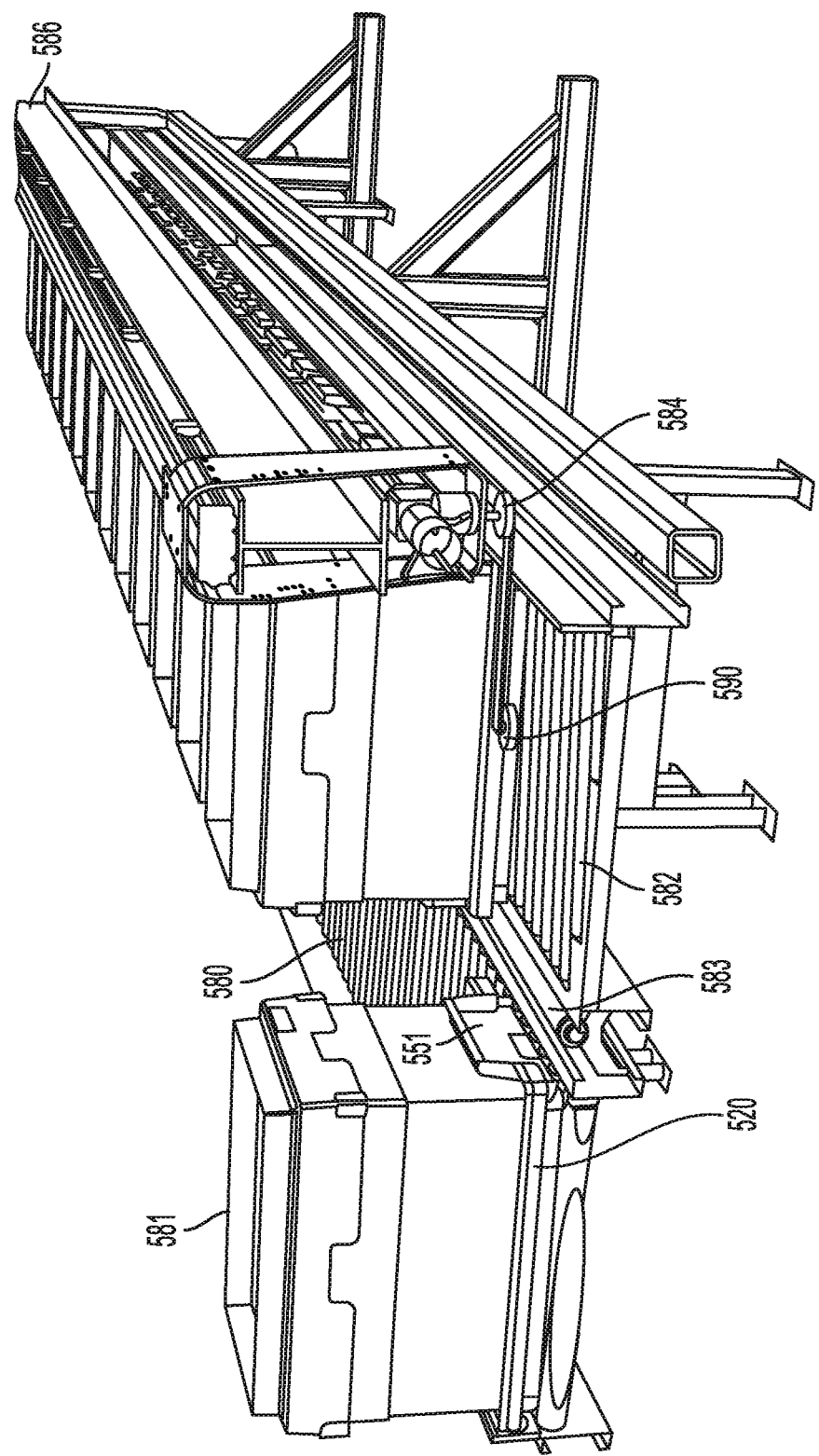

In accordance with further embodiments, the destination bins (e.g., boxes) may be provided in a box tray including inner sides for receiving a box, and a kicker plate that is engageable with a box kicker. With reference to FIGS. 16A-16D, a box kicker 584 may be suspended by and travel along a track 586, and may include a rotatable arm 588 and a roller wheel 590 at the end of the arm 588. With reference to FIGS. 16B-6D, when the roller wheel 590 contacts the kicker plate 551 of a box tray assembly 520, the arm 588 continues to rotate, urging the box tray assembly 580 from a first conveyor 582 to a second conveyor 580. Again, the roller wheel 590 is designed to contact the kicker plate 551 of a box tray assembly 581 to push the box tray assembly 581 onto the conveyor 580. Such a system may be used to provide that boxes that are empty or finished being unloaded may be removed (e.g., from conveyor 582), or that boxes that are full or finished being loaded may be removed (e.g., from conveyor 582). The conveyors 580, 582 may also be coplanar, and the system may further include transition roller 583 to facilitate movement of the box tray assembly 581, e.g., by being activated to pull the box tray over to the conveyor 580.

Following displacement of the bin onto the conveyor 100 (as shown in FIGS. 17 and 18), each of the destination bins may be urged together, and the system will record the change in position of any of the bins that moved. This way, a new empty bin may be added to the end, and the system will record the correct location and identified processing particulars of each of the destination bins.

Figure 19:
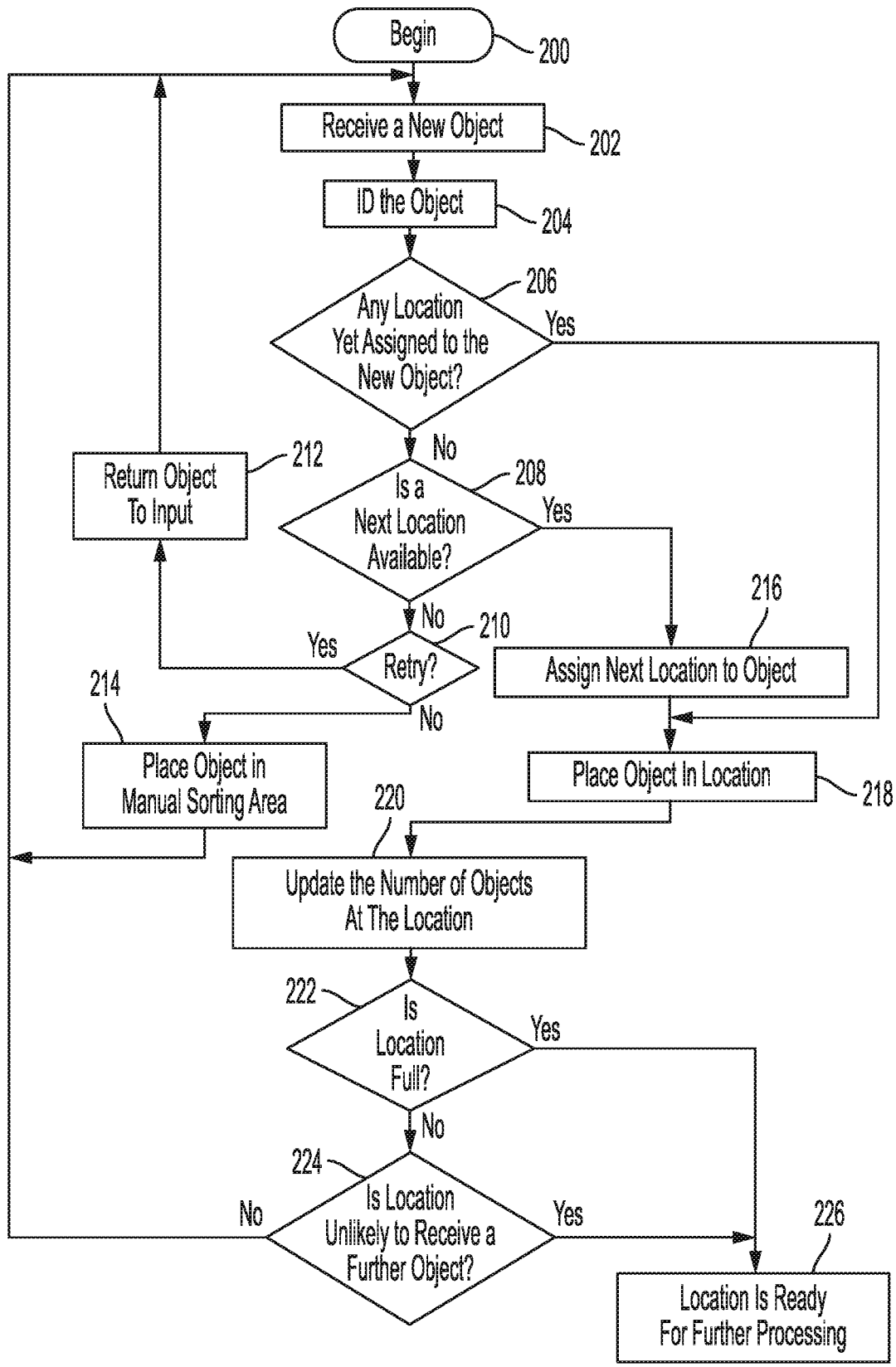
FIG. 19 shows an illustrative diagrammatic flowchart of a sortation process in accordance with an embodiment of the present invention.

FIG. 19 shows a sortation process of the invention. Once the process begins (step 200), a sorting station receives a new object (step 202). The system identifies the new object (step 204) with the object identification system 18. The system then determines whether any routing location has yet been assigned to the new object (step 206). If so, the system routes the object to that location (step 218). If not, the system then determines whether a next location is available (Step 208).

If a next location is available (step 208), the system the assigns a next location to the object (step 216), and the object is then placed in that location (step 218). The number of objects at the location is then updated (step 220), and if the location is then full (step 222), the system identifies that the location is ready for further processing (step 226). The further processing may, for example, include collecting the objects at the location for transport to a shipping location. If the location is not full, the system then determines, based on prior knowledge and/or heuristics, whether the location is unlikely to receive a further object (step 224). If it is not likely to receive a further object, the system identifies that the location is ready for further processing (step 226). If it is likely to receive a further object, the system returns to receiving a new object (step 202).

If in step 208 a next location is not available, the system may (either with or without input from a human) determine whether to retry identifying the object (step 210). If so, then the system would return the object to the input stream (step 212) to be again received at a later time (step 202). If it is determined that the object would not be reintroduced to the input stream for identification, the system would place the object in a manual sorting area for sortation by a human (step 214), and the process would continue with a new object.

Figure 20:
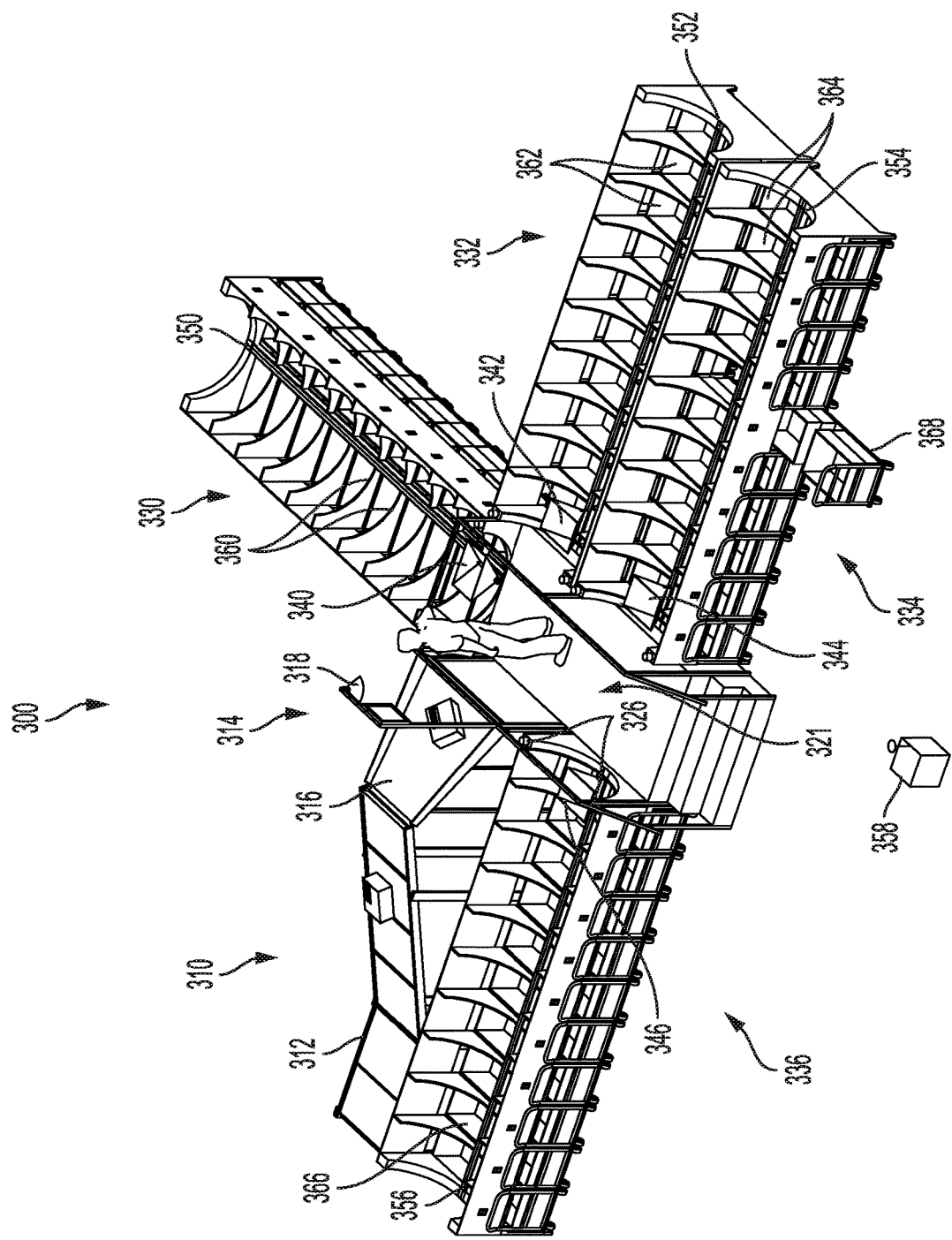
FIG. 20 shows an illustrative diagrammatic view of a semi-autonomous processing system in accordance with another embodiment of the present invention that includes an additional shuttle wing section that is orthogonally disposed with regard to other shuttle wing sections.

FIG. 20 shows a system 300 in accordance with another embodiment of the invention that includes an infeed area 310 into which objects may be provided. Again, the objects may be provided as a generally singulated stream of objects by a programmable motion device, or by having an inclined cleated conveyor draw a stream of objects up from a hopper into which objects may have been deposited, e.g., by a dumper or transferred from a Gaylord. An infeed conveyor 312 conveys objects through the infeed area 310 to a processing station 314 that includes a presentation area such as a declining sloped surface 316. The infeed conveyor may include cleats for assisting in lifting the objects from the infeed conveyor to the sloped surface 316.

The system also includes an identification system 318 that includes a depth detection system and a perception system as discussed above with reference to FIGS. 2-7. Generally, a human worker in a workstation 321 lifts an object from the sloped surface 316, and once the object is identified (as optionally indicated by feedback system 328), a pair of lights (e.g., pair 320, pair 322, pair 324 or pair 326) is illuminated. Each pair of lights 320, 322, 324, 326 is associated with a shuttle wing section 330, 332, 334, 336 that includes a shuttle carriage 340, 342, 344, 346 that rides on a track 350, 352, 354, 356 between rows of destination bins 360, 362, 364, 366 that may be provided on carts 368 as discussed above. For example, each cart may support two destination bins as shown. Once a pair of lights (320, 322, 324, 326) is illuminated, the human worker places the object in the associated carriage. The system then detects this placement, and moves the shuttle carriage to be adjacent a desired destination bin, and tilts the carriage to drop the object in the bin as discussed above with reference to FIGS. 9-19. Operation of the system may be governed by a processing system 358 that includes one or more computer processing systems.

The identification system 318 includes a depth detection system and a plurality of perception units as discussed above that are generally directed toward the sloped surface 316. As discussed above with reference to FIG. 8, when the depth detection system senses any motion, the system will scan the area of the sloped surface 316. The motion may be detected by a beam brake sensor near the bottom of the sloped surface, or may be provided by the depth detection system itself. Once triggered, the depth detection system will conduct a 3D depth scan of the area, which presumably includes one object and may include more than one object (for example, if the cleated conveyor brought two objects up in one cleated section).

The system will then continue to scan the field until it detects an object being moved closer to the detection system. The significance of this is that the system will thereby singulate an object that a human worker has lifted and thereby selected for processing. At this time, the system will concentrate on the area of the object identified as being lifted, and thereby exclude other areas of the field of view as shown discussed above. In particular, the object is identified as being lifted, and the system will exclude other areas of view, which includes another object even though an indicia label is visible on the object while none is yet visible on the object as discussed above.

Once the area of the object is identified, the system will then maintain a view of the general area of the object until identifying indicia is perceived or the object is removed from view. In particular, if identifying indicia is not facing the perception units, the human worker may rotate the item as shown discussed above until identifying indicia is detected by the perception units. In this way, a human worker may lift an object and rotate the object if needed until the system detects identifying indicia, and an optional light may be illuminated or change color (e.g., to green) or a display device 328 may provide information to indicate that the object is identified.

FIGS. 21-24 show a semi-autonomous processing system in accordance with a further embodiment of the present invention that includes an infeed area 410 into which objects may be provided. Again, the objects may be provided as a generally singulated stream of objects by a programmable motion device, or by having an inclined cleated conveyor draw a stream of objects up from a hopper into which objects may have been deposited, e.g., by a dumper or transferred from a Gaylord. An infeed conveyor 412 conveys objects through the infeed area 410 to a processing station 414 that includes a presentation area 416.

Figure 22:
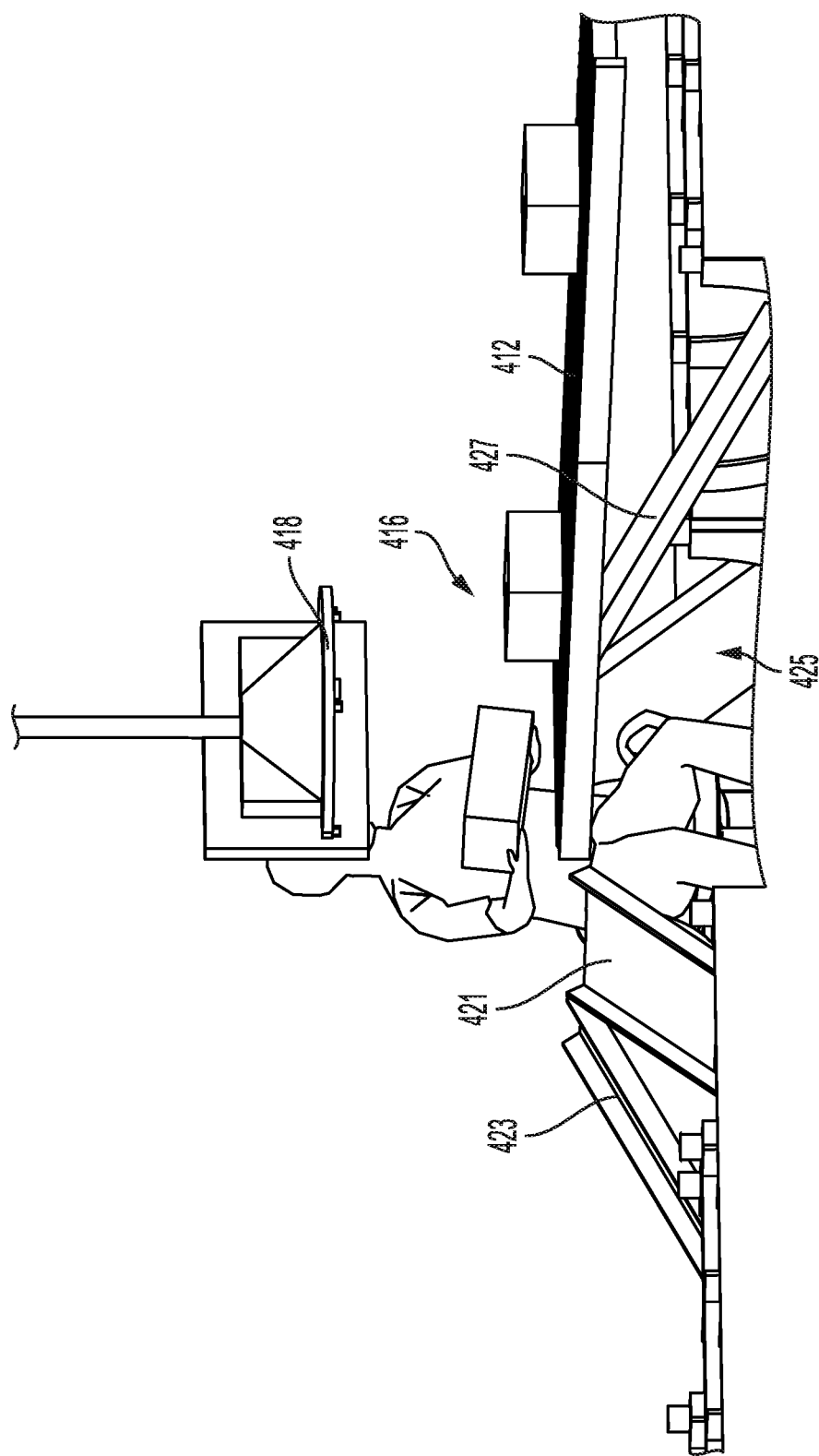
FIG. 22 shows an illustrative diagrammatic view of the infeed area of the system of FIG. 21.

With further reference to FIG. 22, the system also includes an identification system 418 that includes a depth detection system and a perception system as discussed above with reference to FIGS. 2-7. Generally, a human worker in a workstation area 451 lifts an object from the presentation area 416, and once the object is identified (as optionally indicated by a light or monitor as discussed above), a pair of lights (e.g., pair 420, pair 422, pair 424 or pair 426) is illuminated. Each pair of lights 420, 422, 424, 426 is associated with a shuttle wing section 430, 432, 434, 436 that includes a shuttle carriage 440, 442, 444, 446 that rides on a track 450, 452, 454, 456 between rows of destination bins 460, 462, 464, 466 that may be provided on carts 468 as discussed above. For example, each cart may support two destination bins as shown. Once a pair of lights (420, 422, 424, 426) is illuminated, the human worker places the object on a chute 421, 423, 425, 427 that leads to one of the carriages 440, 442, 444, 446 associated with the pair of lights. The system then detects this placement, and moves the shuttle carriage to be adjacent a desired destination bin, and tilts the carriage to drop the object in the bin as discussed above with reference to FIGS. 9-19. Operation of the system may be governed by a processing system 458 that includes one or more computer processing systems.

The identification system 418 includes a depth detection system and a plurality of perception units as discussed above that are generally directed toward the presentation area 416. As discussed above with reference to FIG. 8, when the depth detection system senses any motion, the system will scan the area of the presentation area 416. The motion may be detected by the depth detection system itself. Once triggered, the depth detection system will conduct a 3D depth scan of the area, which presumably includes one object and may include more than one object.

The system will then continue to scan the field until it detects an object being moved closer to the detection system. Again, the significance of this is that the system will thereby singulate an object that a human worker has lifted and thereby selected for processing. At this time, the system will concentrate on the area of the object identified as being lifted, and thereby exclude other areas of the field of view as shown discussed above. In particular, the object is identified as being lifted, and the system will exclude other areas of view, which includes another object even though an indicia label is visible on the object while none is yet visible on the object as discussed above.

Figure 23:
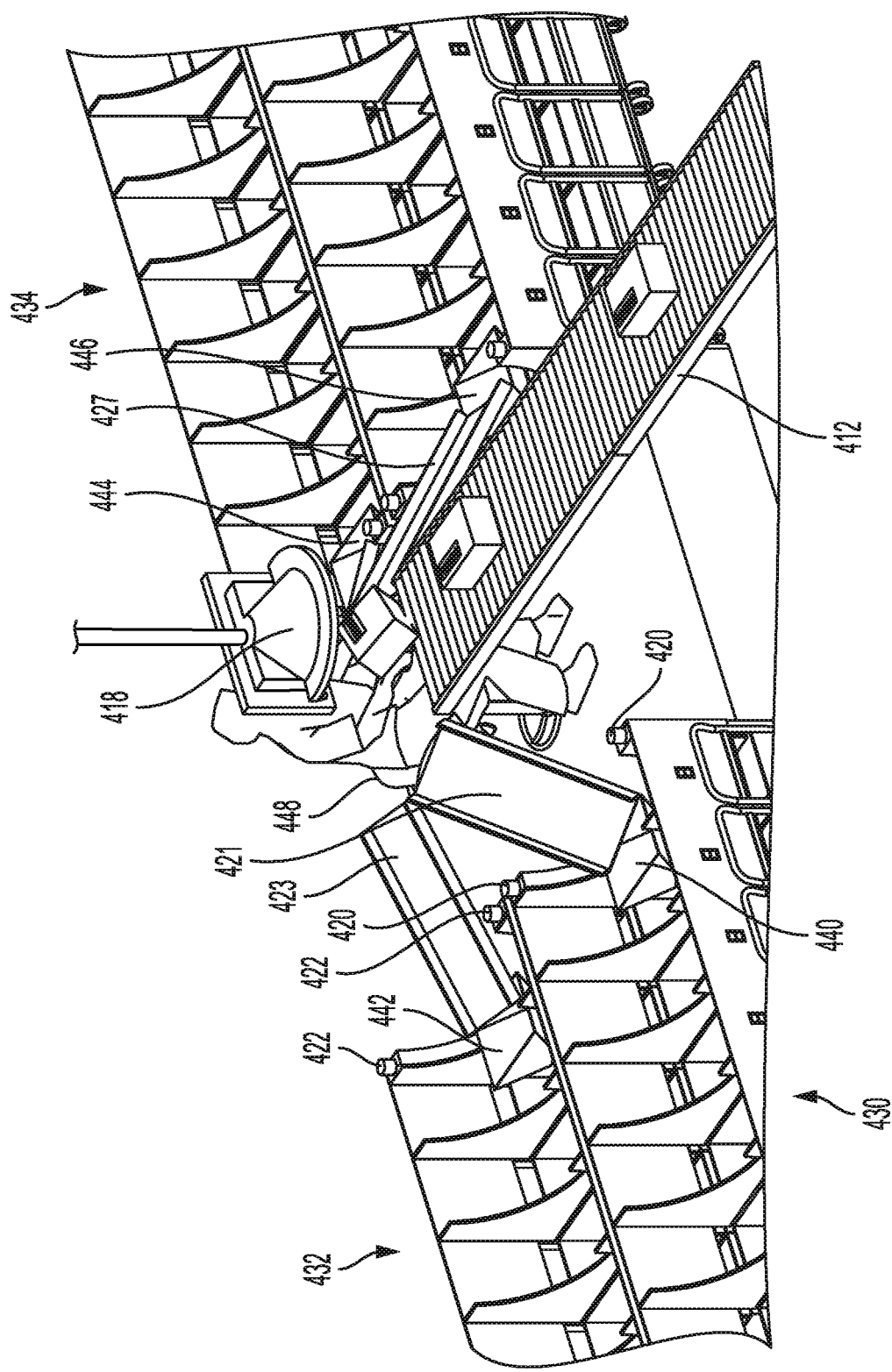
FIG. 23 shows an illustrative diagrammatic view of the processing station of FIG. 21 including the activated chair.
Figure 24:
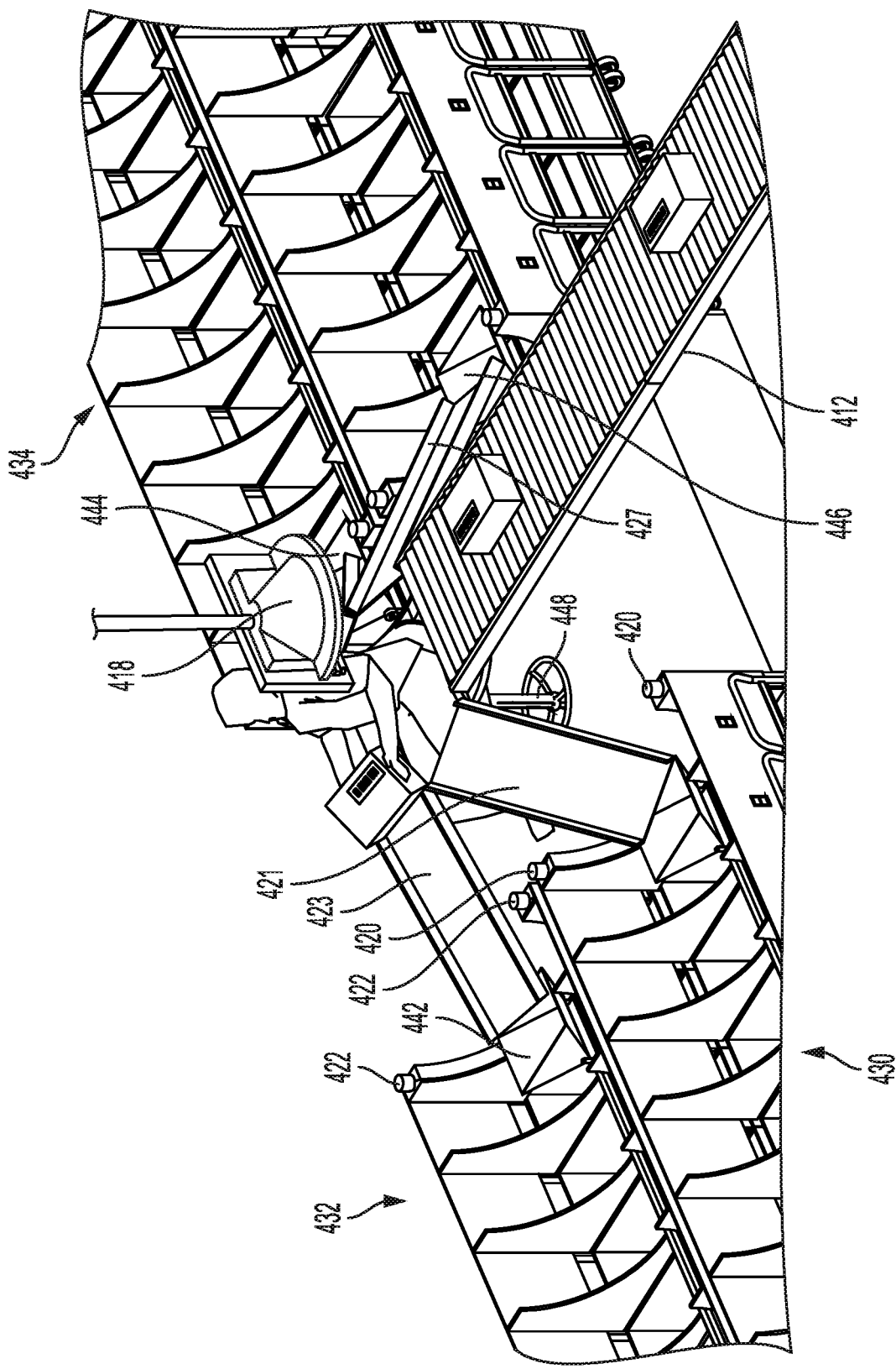
FIG. 24 shows an illustrative diagrammatic view of the processing station of FIG. 21 with the activated chair having been moved.

Once the area of the object is identified, the system will then maintain a view of the general area of the object until identifying indicia is perceived or the object is removed from view. In particular, if identifying indicia is not facing the perception units, the human worker may rotate the item as shown discussed above until identifying indicia is detected by the perception units. In this way, a human worker may lift an object and rotate the object if needed until the system detects identifying indicia, and an optional light may be illuminated or change color (e.g., to green) or a display device 428 may provide information to indicate that the object is identified. As seen in FIGS. 23 and 23, the human worker may also be provided in the current embodiment with an activated chair 448 that may be actively moved to turn toward the designated chute 421, 423, 425, 427 responsive to the identification of the object and the associated shuttle wing section such that once identified, the chair is actively turned to face the chute into which the object is to be placed.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding shuttle wings and destination stations, and more robust since the failure (or off-line status) of a single destination location might be handled dynamically without even stopping the system. It should be possible for sorters to exercise discretion in the order of objects, favoring objects that need to be handled quickly.

Systems of the invention are highly scalable in terms of sorts-per-hour as well as the number of storage bins and destination bins that may be available. The system provides in a specific embodiment an input system that interfaces to the customer's conveyors and containers, stores objects for feeding into the system, and feeds those objects into the system at a moderate and controllable rate. In one embodiment, the interface to the customer's process takes the form of a dumper from a Gaylord, but many other embodiments are possible. In one embodiment, feeding into the system is by an inclined cleated conveyor with overhead flow restrictors, e.g., baffles. In accordance with certain embodiments, the system feeds objects in at a modest controlled rate. Many options are available, including variations in the conveyor slope and speed, the presence, size and structure of cleats and baffles, and the use of sensors to monitor and control the feed rate.

The system includes in a specific embodiment a primary perception system that monitors the stream of objects on the primary conveyor. Where possible the primary perception system may identify the object to speed or simplify subsequent operations. For example, knowledge of the objects on the primary conveyor may enable the system to make better choices regarding which objects to move to provide a singulated stream of objects.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

Figure 21:
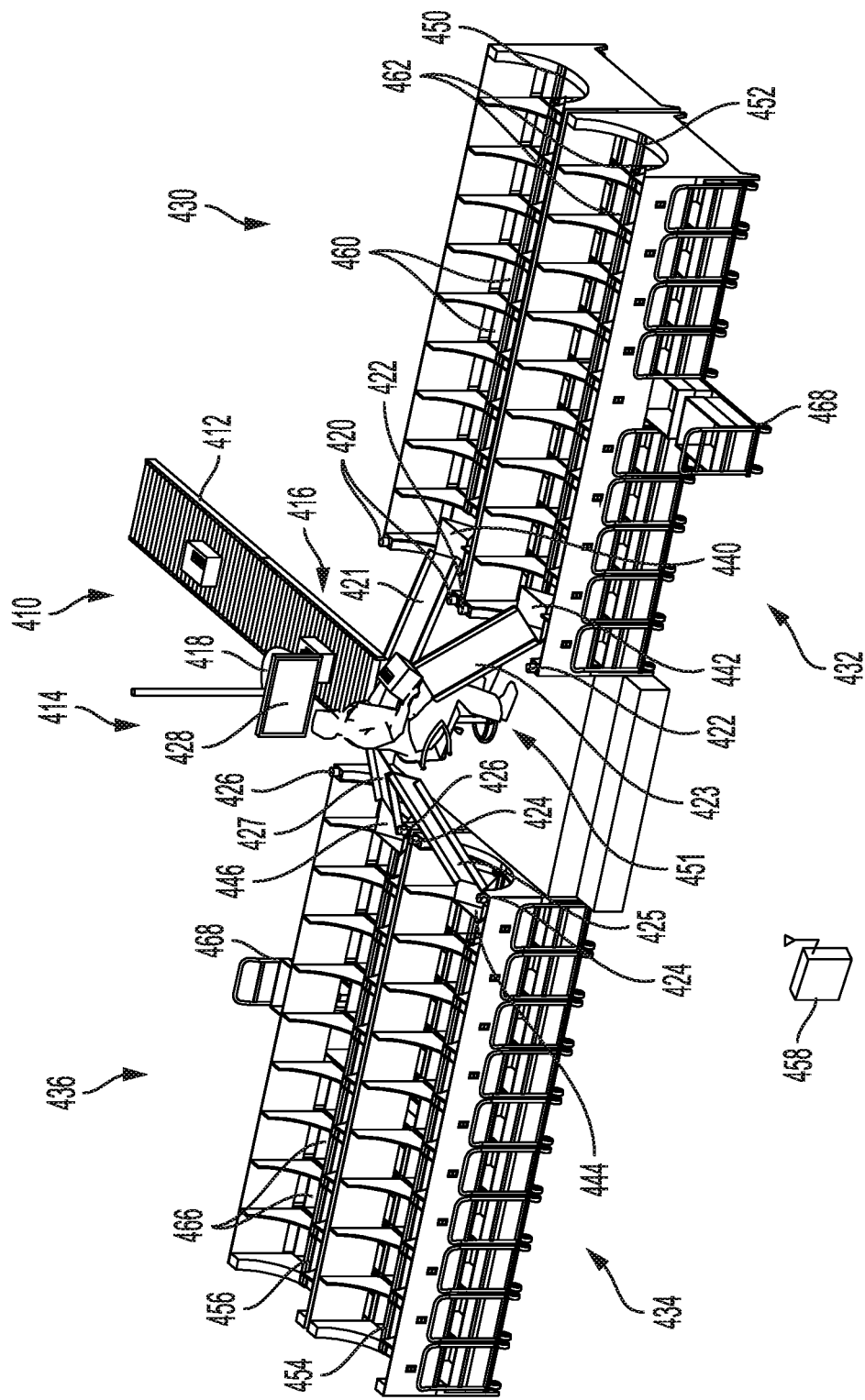
FIG. 21 shows an illustrative diagrammatic view of a semi-autonomous processing system in accordance with a further embodiment of the present invention that includes an infeed area and a processing station including an activated chair.

The operations of the systems described herein are coordinated by the central control system 52, 358 and 458 as shown in FIGS. 1, 20 and 21. The central control system is comprised of one or more workstations or central processing units (CPUs). The correspondence between barcodes, for example, and outbound destinations is maintained by the central control system in a database called a manifest. The central control system maintains the manifest by communicating with a warehouse management system (WMS). If the perception system successfully recognizes a marking on the object, then the object is then identified and forwarded to an assigned destination station. If the object is not identified, the robotic system may divert the object to a human sortation bin to be reviewed by a human.

Those skilled in the art will appreciate that numerous modification and variations may be made to the above disclosed embodiments without departing from the spirit and scope of the present invention.

What is claimed is:

1. A semi-autonomous processing system for processing objects, said semi-autonomous processing system comprising:
   an input conveyance system for moving objects to a presentation area;
   a perception system including perception units that are directed toward a detection area for providing perception data regarding an object in the presentation area;
   at least two transport systems, each of which is adapted to receive the object and move the object in either of reciprocal directions; and
   a manual workstation area including a movable chair arranged between the detection area and the at least two transport systems, wherein the movable chair is actively moved to turn toward a designated chute that leads to one of the at least two transport systems responsive to the perception data from at least one of the perception units that is representative of an identity of the object.

2. The semi-autonomous processing system as claimed in claim 1, wherein the semi-autonomous system includes no automated system for moving the object from the presentation area to either of the two transport systems.

3. The semi-autonomous system as claimed in claim 1, wherein the detection area is above the presentation area.

4. The semi-autonomous processing system as claimed in claim 1, wherein the perception system includes a depth detection system.

5. The semi-autonomous processing system as claimed in claim 4, where the depth detection system is adapted to identify an object that is moving closer to the perception units.

6. The semi-autonomous processing system as claimed in claim 1, wherein each transport system includes a reciprocating carriage.

7. The semi-autonomous processing system as claimed in claim 6, wherein each reciprocating carriage of each transport system is configured to deliver the object to one of a plurality of destination stations.

8. The semi-autonomous processing system as claimed in claim 7, wherein the plurality of destination stations associated with each of the at least two transport systems is provided as two rows of bins or boxes on either side of each transport system.

9. The semi-autonomous processing system as claimed in claim 8, further comprising a plurality of input conveyors, wherein each row of the plurality of bins or boxes is provided on an input conveyor among the plurality of input conveyors.

10. The semi-autonomous processing system as claimed in claim 9, wherein each input conveyor is gravity biased to urge the plurality of bins or boxes on the plurality of input conveyors to one side of the plurality of input conveyors.

11. The semi-autonomous processing system as claimed in claim 9, further comprising a plurality of output conveyors and at least one bin displacement system for selectively urging a bin or box of the plurality of bins or boxes from one of the plurality of input conveyors onto one of the plurality of output conveyors.

12. The semi-autonomous processing system as claimed in claim 11, wherein each output conveyor is gravity biased to urge the bin or box on the output conveyor to one side of the output conveyor.

13. A semi-autonomous processing system for processing objects, said semi-autonomous processing system comprising:
    an input conveyance system for moving objects to a presentation area;
    a perception system including perception units that are directed toward a detection area for providing perception data regarding an object in the presentation area; and
    at least two transport systems, each of which is adapted to receive the object and move the object in either of reciprocal directions, wherein the semi-autonomous system includes no automated system for moving the object from the presentation area to either of the two transport systems; and
    a manual workstation area between the presentation area and the at least two transport systems, wherein the manual workstation area includes a movable chair that is adapted to move responsive to the perception data from at least one of the perception units that is representative of an identity of the object.

14. The semi-autonomous system as claimed in claim 13, wherein the detection area is above the presentation area.

15. The semi-autonomous processing system as claimed in claim 13, wherein the perception system includes a depth detection system.

16. The semi-autonomous processing system as claimed in claim 15, where the depth detection system is adapted to identify an object that is moving closer to the perception units.

17. A method for providing semi-autonomous processing of objects, said method comprising:
moving objects on an input conveyance system to a presentation area;
providing perception data that is representative of an identity of an object in the presentation area;
activating a movable chair to turn from the presentation area toward a designated chute that leads to one of at least two transport systems responsive to the perception data;
receiving the object in the one of the at least two transport systems from an operator in the movable chair that places the object in the designated chute; and
moving the object in either of reciprocal directions of the transport system that receives the object.

18. The method as claimed in claim 17, wherein the method further includes providing depth data from a depth detection system of an object in the presentation area.

19. The method as claimed in claim 18, where the method further includes identifying the object that is moving closer to the perception units based on the depth data provided from the depth detection system.

20. The method as claimed in claim 17, wherein each of the at least two transport systems includes a carriage and a track, and the method further comprising moving the carriage along the track to deliver the object to one of a plurality of destination locations disposed on along the sides of the track.

21. The method as claimed in claim 20, wherein the object is delivered to one of the plurality of destination locations by rotating the carriage to dump the object into the destination location.

22. A semi-autonomous processing system for processing objects, said semi-autonomous processing system comprising:
an input conveyance system for moving objects to a presentation area;
a perception system including perception units that are directed toward a detection area for providing perception data regarding an object in the presentation area;
at least two transport systems, each of which is adapted to receive the object and move the object in either of reciprocal directions; and
a manual workstation area between the detection area and the at least two transport systems; and
a plurality of input conveyors;
wherein each transport system includes a reciprocating carriage that is configured to deliver the object to one of a plurality of destination stations, wherein the plurality of destination stations associated with each of the at least two transport systems is provided as two rows of bins or boxes on either side of each transport system,
wherein each row of the plurality of bins or boxes is provided on an input conveyor among the plurality of input conveyors, and
wherein each input conveyor is gravity biased to urge the plurality of bins or boxes to one side of the plurality of input conveyors.

23. The semi-autonomous processing system as claimed in claim 22, wherein the semi-autonomous system includes no automated system for moving the object from the presentation area to either of the two transport systems.

24. The semi-autonomous processing system as claimed in claim 22, wherein the manual workstation area includes a movable chair.

25. The semi-autonomous processing system as claimed in claim 24, wherein the movable chair is adapted to move responsive to the perception data from at least one of the perception units that is representative of an identity of the object.

26. The semi-autonomous system as claimed in claim 22, wherein the detection area is above the presentation area.

27. The semi-autonomous processing system as claimed in claim 22, further comprising a plurality of output conveyors and at least one bin displacement system for selectively urging a bin or box of the plurality of bins or boxes from one of the plurality of input conveyors onto one of the plurality of output conveyors.

28. The semi-autonomous processing system as claimed in claim 27, wherein each output conveyor is gravity biased to urge the bin or box on the output conveyor to one side of the output conveyor.

29. The semi-autonomous processing system as claimed in claim 27, wherein the perception system includes a depth detection system.

30. The semi-autonomous processing system as claimed in claim 29, where the depth detection system is adapted to identify an object that is moving closer to the perception units.

31. A semi-autonomous processing system for processing objects, said semi-autonomous processing system comprising:
an input conveyance system for moving objects to a presentation area;
a perception system including perception units that are directed toward a detection area for providing perception data regarding an object in the presentation area;
at least two transport systems, each of which is adapted to receive the object and move the object in either of reciprocal directions; and
a manual workstation area between the detection area and the at least two transport systems,
a plurality of input conveyors;
a plurality of output conveyors; and
at least one bin displacement system,
wherein each transport system includes a reciprocating carriage that is configured to deliver the object to one of a plurality of destination stations, wherein the plurality of destination stations associated with each of the at least two transport systems is provided as two rows of bins or boxes on either side of each transport system,
wherein each row of the plurality of bins or boxes is provided on an input conveyor among the plurality of input conveyors, and
wherein the at least one bin displacement system is configured to selectively urge a bin or box among the plurality of bins or boxes onto one of the plurality of output conveyors.

32. The semi-autonomous processing system as claimed in claim 31, wherein the semi-autonomous system includes no automated system for moving the object from the presentation area to either of the two transport systems.

33. The semi-autonomous processing system as claimed in claim 31, wherein the manual workstation area includes a movable chair.

34. The semi-autonomous processing system as claimed in claim 33, wherein the movable chair is adapted to move responsive to the perception data from at least one of the perception units that is representative of an identity of the object.

35. The semi-autonomous system as claimed in claim 31, wherein the detection area is above the presentation area.

36. The semi-autonomous processing system as claimed in claim 31, wherein each input conveyor is gravity biased to urge the plurality of bins or boxes to one side of the plurality of input conveyors.

37. The semi-autonomous processing system as claimed in claim 31, wherein each output conveyor is gravity biased to urge the bin or box on the output conveyor to one side of the output conveyor.

38. The semi-autonomous processing system as claimed in claim 31, wherein the perception system includes a depth detection system.

39. The semi-autonomous processing system as claimed in claim 38, where the depth detection system is adapted to identify an object that is moving closer to the perception units.

* * * * *